(12) United States Patent
Kawagoe et al.

(10) Patent No.: US 7,660,650 B2
(45) Date of Patent: Feb. 9, 2010

(54) SELF-PROPELLED WORKING ROBOT HAVING HORIZONTALLY MOVABLE WORK ASSEMBLY RETRACTING IN DIFFERENT SPEED BASED ON CONTACT SENSOR INPUT ON THE ASSEMBLY

(75) Inventors: Nobukazu Kawagoe, Tokyo (JP); Shiegeru Oyokota, Tokyo (JP)

(73) Assignee: Figla Co., Ltd., Tokyo (JP)

( * ) Notice: Subject to any disclaimer, the term of this patent is extended or adjusted under 35 U.S.C. 154(b) by 765 days.

(21) Appl. No.: 10/572,729

(22) PCT Filed: Oct. 5, 2004

(86) PCT No.: PCT/JP2004/014626

§ 371 (c)(1),
(2), (4) Date: Mar. 21, 2006

(87) PCT Pub. No.: WO2005/036292

PCT Pub. Date: Apr. 21, 2005

(65) Prior Publication Data

US 2007/0032904 A1    Feb. 8, 2007

(30) Foreign Application Priority Data

Oct. 8, 2003  (JP)  ............... 2003-349296
Sep. 7, 2004  (JP)  ............... 2004-259181
Sep. 7, 2004  (JP)  ............... 2004-259346

(51) Int. Cl.
G01C 22/00  (2006.01)
B60T 7/16   (2006.01)
B62D 1/24   (2006.01)
B25J 19/02  (2006.01)
B25J 9/10   (2006.01)
G05B 19/416 (2006.01)

(52) U.S. Cl. .................. 701/23; 701/24; 701/25; 701/26; 180/167; 318/568.16; 318/568.17; 318/568.18

(58) Field of Classification Search .............. None
See application file for complete search history.

(56) References Cited

U.S. PATENT DOCUMENTS 5,377,106 A * 12/1994 Drunk et al. ............ 701/25

(Continued)

FOREIGN PATENT DOCUMENTS

JP    56-164602    12/1981

(Continued)

OTHER PUBLICATIONS

International Search Report for corresponding Application No. PCT/JP2004/014626 mailed Jan. 11, 2005.

*Primary Examiner*—Thomas G Black
*Assistant Examiner*—Sze-Hon Kong
(74) *Attorney, Agent, or Firm*—Renner, Otto, Boisselle & Sklar, LLP

(57) ABSTRACT

The present invention relates to a self-propelled working robot, including a first distance sensor 4a and a second distance sensor 4b (4c) for measuring the distance to an obstacle W in front of the robot. The robot includes first determination means for comparing a first measured distance Dc to the obstacle obtained by the first distance sensor 4a with a predetermined first threshold value to determine the proximity to the obstacle W, second determination means for comparing a second measured distance Dr ($D_L$) to the obstacle W obtained by the second distance sensor 4b (4c) with a predetermined second threshold value to determine the proximity to the obstacle, and changing means for changing the first or second threshold value based on information regarding an inclination angle of the obstacle W obtained from the first and second measured distances.

3 Claims, 24 Drawing Sheets

U.S. PATENT DOCUMENTS

| | | | |
|---|---|---|---|
| 5,568,589 A | | 10/1996 | Hwang |
| 5,696,675 A | * | 12/1997 | Nakamura et al. ............ 701/50 |
| 5,896,488 A | * | 4/1999 | Jeong ........................ 700/255 |
| 5,903,124 A | * | 5/1999 | Kawakami ................. 318/587 |
| 6,226,830 B1 | * | 5/2001 | Hendriks et al. .............. 15/319 |
| 6,941,199 B1 | * | 9/2005 | Bottomley et al. ............ 701/23 |
| 2005/0085947 A1 | * | 4/2005 | Aldred et al. ............... 700/253 |

FOREIGN PATENT DOCUMENTS

| | | |
|---|---|---|
| JP | 60-206759 | 10/1985 |
| JP | 05-257533 | 10/1993 |
| JP | 06-189610 | 7/1994 |
| JP | 08-263137 | 10/1996 |
| JP | 09-114523 | 5/1997 |
| JP | 09-269810 | 10/1997 |

* cited by examiner

FIG.15
(a)
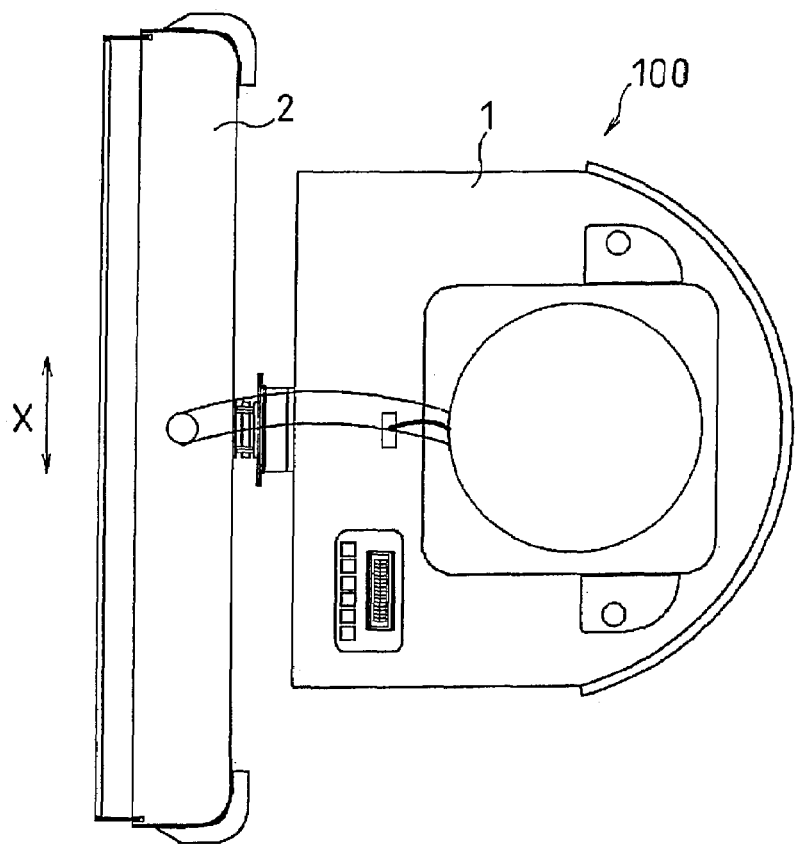
(b)
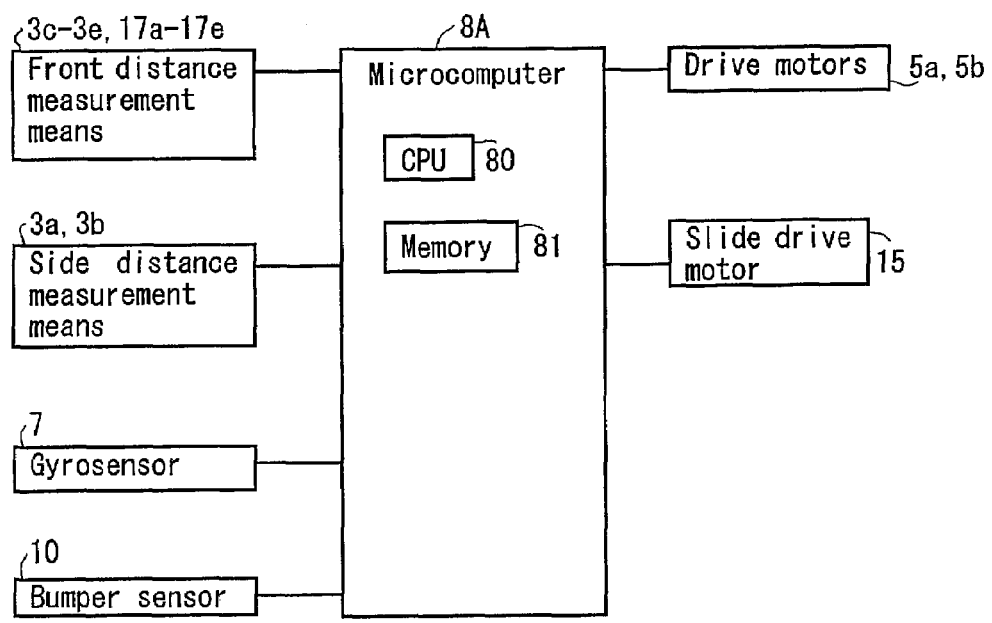

FIG.24
(a)
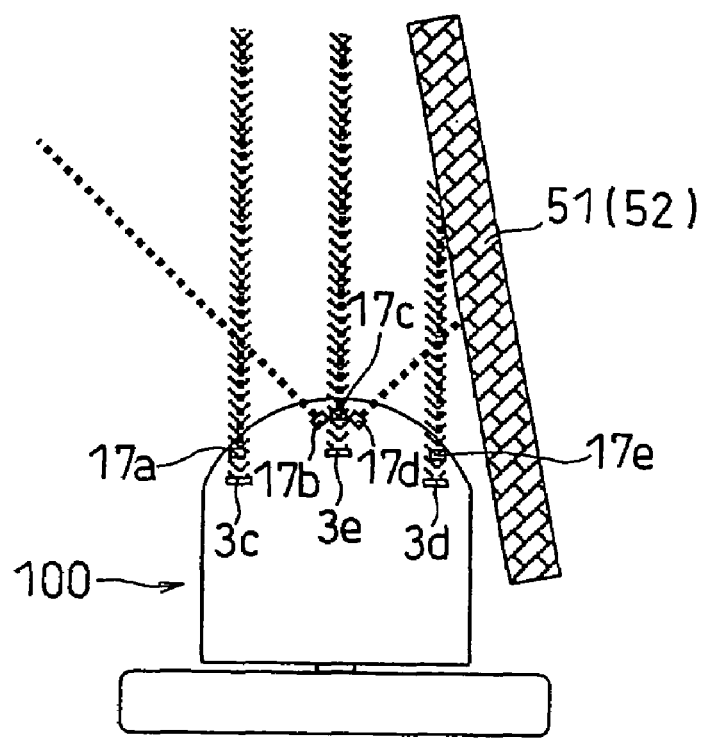
(b)
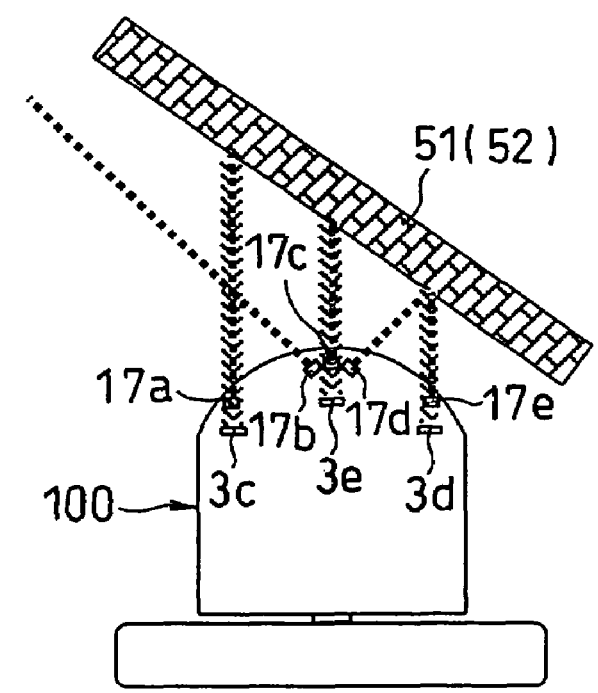

SELF-PROPELLED WORKING ROBOT HAVING HORIZONTALLY MOVABLE WORK ASSEMBLY RETRACTING IN DIFFERENT SPEED BASED ON CONTACT SENSOR INPUT ON THE ASSEMBLY

TECHNICAL FIELD

The present invention relates to a working robot suitable for doing work on a floor surface near a wall, or the like.

BACKGROUND ART

There are known self-propelled working robots in the prior art for doing work such as cleaning the floor surface near the wall.

A working robot of this type includes a plurality of distance sensors for measuring the distance from the robot body to an obstacle. If the distance measured by the distance sensor is smaller than a predetermined threshold value, the robot is controlled so as not to collide with the wall by a predetermined avoidance operation. The threshold value is set to a predetermined constant value such that the robot will not be too far away from the wall.

Where the threshold value is not sufficiently large, however, if the inclination angle between the body and the obstacle, a side portion of the front end portion of the robot comes proximate to the obstacle even though the central head portion of the robot is not proximate to the obstacle. Then, the detection may delay, whereby the robot may collide with the obstacle.

Therefore, a primary object of the present invention is to provide a self-propelled working robot capable of precisely detecting various obstacles.

In the prior art, a working robot of this type had a problem in that it is difficult to do work on corner areas, particularly those that are not right-angled, between walls around the work area, and the work may be incomplete in such areas.

For example, while a cleaning robot disclosed in Japanese Laid-Open Patent Publication No. 9-269810 is capable of generally cleaning right-angled corner areas, the work may be incomplete in corner areas that are not right-angled. While the operation of this cleaning robot is controlled according to a pre-stored operation sequence, there is no description on the operation for completely cleaning corner areas that are not right-angled. Therefore, only with the control method disclosed therein, there may remain uncleaned portions in corner areas, Where dust collects most easily.

An autonomous traveling vehicle disclosed in Japanese Laid-Open Patent Publication No. 9-114523 is capable of traveling in parallel to a wall that is facing a side surface of the vehicle. However, as with the above cleaning robot, there may remain uncleaned portions in corner areas, where dust collects most easily.

Therefore, another object of the present invention is to provide a self-propelled working robot capable of doing work completely in corners on an area of a floor surface of the work area.

Self-propelled working robots provided with contact sensors for detecting a contact with an obstacle have been proposed in the prior art (for example, Japanese Patent No. 3201208 (FIG. 2), Japanese Laid-Open Patent Publication No. 60-206759 (FIG. 1), and Japanese Laid-Open Utility Model Publication No. 56-164602 (FIG. 5)).

However, a conventional self-propelled working robot of this type cannot appropriately and quickly perform an avoidance operation when contacting the obstacle. Thus, there are problems such as the traveling speed being significantly low or the robot being too far away from the wall.

Therefore, still another object of the present invention is to provide a self-propelled working robot capable of appropriately and quickly responding to a contact with an obstacle from any direction.

In order to achieve the primary object set forth above, a first embodiment of the present invention is directed to a self-propelled working robot, including a first distance sensor for measuring a distance to an obstacle in a front direction of the robot, and a second distance sensor for measuring a distance to the obstacle in a diagonally forward direction of the robot, the robot including: first determination means for comparing a first measured distance to the obstacle obtained by the first distance sensor with a predetermined first threshold value (SHc) to determine proximity to the obstacle; second determination means for comparing a second measured distance to the obstacle obtained by the second distance sensor with a predetermined second threshold value (SHr) to determine proximity to the obstacle; and changing means for changing the first or second threshold value (SHc or SHr) based on information regarding an inclination angle of the obstacle obtained from the first and second measured distances.

According to the present invention, the obstacle is detected by the first and second determination means, and the first threshold value or the second threshold value (SHc or SHr) is changed based on information regarding the inclination angle of the obstacle, whereby it is possible to precisely detect an obstacle even if the obstacle has a large inclination angle.

In the present invention, the information regarding the inclination angle can be obtained based on an arrangement of the first and second distance sensors, light emitting directions of the first and second distance sensors, and the first and second measured distances.

Herein, the term "front" is defined with reference to the moving direction of the working robot.

The term "the inclination angle of the obstacle obtained from the first and second measured distances" is, for example, the angle β between the normal L orthogonal to the surface of the obstacle W and the moving direction F of the present robot as shown in FIG. 5.

In a preferred embodiment of the present invention, the robot obtains a determination result from the first determination means as to proximity to the obstacle and a determination result from the second determination means as to proximity to the obstacle irrespective of a magnitude of the inclination angle, and concludes that the robot is proximate to the obstacle if either one of the two determination results indicates that the obstacle is proximate.

Where the first distance is smaller than the second distance, i.e., where the inclination angle is small, it is the first determination means, but not the second determination means, that determines that the robot is proximate to the obstacle. Where the first distance is larger than the second distance, i.e., where the inclination angle is large, it is the second determination means, but not the first determination means, that determines that the robot is proximate to the obstacle. Thus, it is possible to make a determination and conclusion as to the proximity irrespective of the magnitude of the inclination angle.

In the present invention, however, the proximity to the obstacle may be determined based on the determination result from the first determination means if the inclination angle is smaller than a predetermined value, and the proximity to the obstacle may be determined based on the determination result from the second determination means if the inclination angle is larger than a predetermined value.

Thus, by selectively using the determination result from the first determination means for a position in front of the robot and the determination result from the second determination means for a position diagonally in front of the robot based on the inclination angle of the obstacle, it is possible to detect the obstacle irrespective of the inclination angle of the obstacle.

In the present invention, the changing means sets the first threshold value or the second threshold value (SHc or SHr) so that the first or second threshold value (SHc or SHr) increases as the inclination angle increases. Thus, by increasing the first or second threshold value SHc or SHr, it is possible to detect the obstacle before a side portion of the front end portion of the robot contacts the obstacle.

In the present invention, it is preferred that the first and second distance sensors are arranged close to each other. Then, the first measured distance and the second measured distance can be compared with each other so that it is possible to detect the proximity to the obstacle based on the determination result from the first determination means if the first measured distance is smaller than the second measured distance, and to detect the proximity to the obstacle based on the determination result from the second determination means (or the first determination means) if the first measured distance is larger than the second measured distance. Thus, if the distance sensors are arranged close to each other and the first measured distance is smaller than the second measured distance, the first threshold value SHc and the second threshold value SHr may be set to the same value, for example.

Thus, by comparing the first measured distance and the second measured distance with each other, the first determination result and the second determination result can selectively be used based on the inclination angle between the robot body and the obstacle, whereby it is possible to detect the obstacle irrespective of the inclination angle of the obstacle.

In the present invention, it is preferred that the first and second distance sensors are optical distance sensors; the first distance sensor is provided in a head portion of the robot located at a center of the robot in a left-right direction; a pair of the second distance sensors are provided on both sides of, and close to, the first distance sensor; and ultrasonic distance sensors for measuring a distance to the obstacle in a front direction of the robot are provided in both side portions of a front end portion of the robot, in addition to the first and second optical distance sensors.

Thus, by using ultrasonic distance sensors and optical distance sensors in combination, it is possible to more accurately detect the obstacle.

The "optical distance sensor" may be, for example, a commercially-available optical distance sensor capable of emitting light and receiving a portion of the light beam diffusively reflected off by the obstacle through a light-receiving lens, thereby measuring the distance between itself and the obstacle by triangulation.

The "ultrasonic distance sensor" may be a commercially-available ultrasonic distance sensor capable of emitting an ultrasonic wave and measuring the distance to the object by measuring the amount of time taken for the ultrasonic wave to return from the obstacle as a reflected wave.

In the present invention, it is preferred that the first and second distance sensors are optical distance sensors; the first distance sensor is provided in a head portion of the robot located at a center of the robot in a left-right direction; a pair of the second distance sensors are provided on both sides of, and close to, the first distance sensor; and a protection cover is provided in the head portion of the robot, the protection cover having a recess with three side surfaces and a ceiling surface, wherein the three sensors are closely facing the three side surfaces; and a third distance sensor is provided on an inner position opposed to the ceiling surface for measuring a distance to a position in front of, and diagonally below, the third distance sensor.

Thus, by providing the third distance sensor for detecting an object in front of, and diagonally below, the third distance sensor, it is possible to detect unevenness of the floor surface in front of the robot. Since the distance sensors are provided in the recess of the protection cover, it is possible to prevent the recess surface from being scratched.

A robot according to a second embodiment of the present invention includes: a traveling assembly having a wheel rotating on a floor surface; a working assembly for doing work on the floor, wherein the working assembly is attached to the traveling assembly so that the working assembly is movable in a left-right direction with respect to the traveling assembly; a moving mechanism for moving the working assembly with respect to the traveling assembly so as to change a positional relationship between the traveling assembly and the working assembly; a first contact sensor provided in the working assembly for detecting contact of the obstacle with a front surface of the working assembly; a second contact sensor provided in the working assembly for detecting a contact of the obstacle with a side surface of the working assembly; and control means for controlling a travel of the traveling assembly, for controlling the moving mechanism to move the working assembly left and right at a first retraction speed based on a detection signal from the first contact sensor, and for controlling the moving mechanism to move the working assembly left and right at a second retraction speed, being lower than the first retraction speed, based on a detection signal from the second contact sensor.

When the obstacle in front of the robot contacts the front surface of the working assembly while the robot is moving forward, the first contact sensor detects the contact, and the working assembly retracts at the first, higher, retraction speed either to the left or to the right, whichever direction in which the obstacle is absent, until there is no longer a contact. Thus, the robot can travel while keeping a somewhat high traveling speed.

The term "front" or "front surface" as used herein is defined with respect to the moving direction of the robot.

When the obstacle contacts the side surface of the working assembly while the robot is moving forward, the second contact sensor detects the contact, and the working assembly retracts at the second, lower, retraction speed either to the left or to the right, whichever is opposite to the obstacle, until there is no longer a contact. Therefore, the robot can travel while the working assembly is along the obstacle, whereby the working assembly will not be too far away from the wall, being the obstacle.

In the present invention, it is preferred that the control means has a function to stop the travel if a time for which a contact is being detected by the first contact sensor is longer than a predetermined time.

Then, it is possible to prevent the working robot from being broken and the obstacle from being damaged due to the contact between the working robot and the obstacle.

In the present invention, it is preferred that the predetermined time is set to a small value when a traveling speed is high, and is set to a large value when the traveling speed is low.

Then, it is possible to prevent an unnecessary stop while the robot is traveling at a low speed, and to prevent the present working robot or the obstacle from being damaged while the robot is traveling at a high speed.

In the present invention, it is preferred that when the travel is stopped upon detecting that the detection time of the first contact sensor exceeds a predetermined threshold value, the control means controls the traveling assembly and the working assembly moving mechanism so that the robot is moved back by a predetermined distance after the stop and that the working assembly is moved in the retracting direction by a predetermined distance, after which the forward travel is resumed.

Then, it is possible to prevent the robot from moving with the working assembly being in contact with the obstacle, whereby it is possible to prevent an obstacle such as a wall from being scratched by the working assembly.

In the present invention, it is preferred that when the working assembly is moved based on the detection signal from the contact sensor, the control means controls the moving mechanism so that, after both of the contact sensors no longer detect a contact, the relative position of the working assembly with respect to the traveling assembly is returned, at a return speed being lower than the second retraction speed, to the previous position taken before the contact is detected by the contact sensor.

Then, it is possible to reduce the impact of the contact between the obstacle and the working assembly while the working assembly returns to the original position.

In the present invention, it is preferred that the working assembly is formed generally in a rectangular shape as seen in a plan view, and the contact sensor includes a bumper surrounding the periphery of the working assembly, a detection target portion moving together with the bumper, and a detection switch for detecting the detection target portion.

Then, since the bumper is surrounding the periphery of the working assembly, it is possible to detect a contact with an obstacle by detecting the detection target portion, which moves together with the bumper.

In the present invention, it is preferred that the bumper is divided into a left bumper and a right bumper, each of which is provided with the detection target portion and the detection switch, wherein the left bumper is positioned at a predetermined leftmost position while being urged leftward by a spring force, and the right bumper is positioned at a predetermined rightmost position while being urged rightward by a spring force.

Thus, the bumper is divided into a left bumper and a right bumper, which are positioned at the leftmost position and the rightmost position, respectively, while being urged by a spring force. Thus, it is not necessary to support the bumper floating in the air, and the bumper will not be swinging left and right while the robot is traveling. Thus, it is possible to precisely detect a contact with a wall.

In the present invention, it is preferred that the bumper is divided in the left-right direction and in the front-rear direction into a front left bumper, a front right bumper, a rear left bumper and a rear right bumper, each of which is provided with the detection target portion and the detection switch, wherein the front left bumper is positioned at a predetermined leftmost and foremost position while being urged leftward and forward by a spring force, the front right bumper is positioned at a predetermined rightmost and foremost position while being urged rightward and forward by a spring force, the rear left bumper is positioned at a predetermined leftmost and rearmost position while being urged leftward and rearward by a spring force, and the rear right bumper is positioned at a predetermined rightmost and rearmost position while being urged rightward and rearward by a spring force.

By dividing a bumper in the front-rear direction and in the left-right direction into four pieces, it is possible to detect a contact with a wall in the front, rear, left and right directions.

In the present invention, it is preferred that the bumper is divided in the left-right direction and in the front-rear direction into a front left bumper, a front right bumper, a rear left bumper and a rear right bumper, each of which is provided with the detection target portion and the detection switch, wherein each of the divided bumpers is positioned by a stopper at a predetermined position while being urged by the spring force outwardly so that it can retract inwardly when contacted by the obstacle.

Thus, as the bumper is divided into four pieces, with the supporting member for each bumper being urged by the spring force into contact with the stopper, the bumper divided into small pieces can be stably supported. Therefore, even if the working section is long in the left-right direction, the bumper will not be bent.

In this case, it is more preferred that the bumpers are continuous around the four corner portions of the working assembly and are separated from one another in the front surface, the rear surface and the two side surfaces.

With the bumpers being continuous around the four corner portions of the working assembly, the four corner portions of the bumpers will not be engaged with (get caught on) the obstacle, whereby it is possible to expect the robot to travel smoothly.

Still another robot of the present invention further includes: a traveling assembly capable of rotating (turning) in place about a vertical line to a floor surface; a working assembly for doing work on the floor surface, wherein the working assembly is attached to a front or a rear of the traveling assembly; rotation angle measurement means for measuring a rotation angle of the traveling assembly about the vertical line; storage means for storing the rotation angle; a plurality of front distance measurement means provided on the traveling assembly and spaced apart from each other in a width direction of the traveling assembly for measuring a distance to an front obstacle located in a moving direction of the traveling assembly; side distance measurement means for measuring a distance to an side obstacle located sideways with respect to the moving direction of the traveling assembly; determination means for determining, based on a plurality of measured values obtained by the side distance measurement means, whether or not the traveling assembly is traveling along a side wall; and control means for controlling a traveling operation of the traveling assembly, wherein: the control means determines that, when a measured value obtained by at least one of the plurality of front distance measurement means is less than or equal to a predetermined stop limit distance (SHd), the traveling assembly is close to the front obstacle in front of the robot and stops the travel of the traveling assembly, and the control means compares the measured values of the plurality of front distance measurement means with one another to determine whether or not a difference or a ratio between measured distances to a surface of the front obstacle is within a predetermined range, wherein if it is determined that the difference or the ratio between the measured distances is outside the predetermined range, the control means controls the traveling assembly to rotate in place about the vertical line until the difference or the ratio between the measured distances is within the predetermined range, and stores in the storage means the rotation angle of the traveling assembly when the difference or the ratio falls within the predetermined range; and if it is determined by the determination means that the traveling assembly has been traveling along a side wall before the rotating operation, the control means controls a traveling operation of the traveling assembly so that the robot does work on a corner area formed by the side wall and the front obstacle in front of the robot and then travel along the front obstacle in front of the robot based on the rotation angle stored in the storage means.

In the present invention, when detecting the front obstacle that is inclined, more than a predetermined angle, with respect to the moving direction of the traveling assembly, the traveling assembly stops traveling, and the traveling assembly turns in place about the vertical line until the measured distances from the plurality of front distance measurement means become generally equal to each other. Since the inclination angle of the front obstacle with respect to the moving direction of the traveling assembly is equal to the rotation angle at the point in time when the measured distances from the plurality of front distance measurement means become generally equal to each other, it is possible to obtain the inclination angle of the front obstacle by measuring the rotation angle by using the rotation angle measurement means. By detecting the presence/absence of a side wall by using the determination means, it is possible to determine whether or not it is necessary to do work on a corner area. When it is determined that the traveling assembly has been traveling along the side wall, the traveling assembly is controlled so as to travel along the front obstacle in front of the robot after doing work on the corner area. In contrast, if it is determined that the traveling assembly is traveling at a position away from the side wall, the traveling assembly is controlled so as to start traveling along the obstacle in front of the robot immediately after the turn operation.

According to the present invention, since the traveling operation of the traveling assembly is controlled based on the inclination angle of the front obstacle and the presence/absence of the side wall, irrespective of the inclination angle of the front obstacle in front of the traveling assembly, whereby it is possible to reliably do work on a corner area formed by the side wall and the front obstacle in front of the robot. Accordingly, it is possible to completely do work on the floor surface of the work area.

In the present invention, it is preferred that, when the front distance measurement means detects the front obstacle and the traveling assembly stops, the determination means makes the above determination before the traveling assembly starts rotating in place, and if it is determined by the determination means that the traveling assembly has been traveling along the side wall before the rotating operation, the control means controls the traveling operation of the traveling assembly so as to move the center of rotation for the rotating operation a predetermined distance away from the side wall before the rotating operation.

According to this embodiment, the center of rotation for the rotating operation is shifted away from the side wall by a predetermined distance before the traveling assembly turns in place, whereby it is possible to prevent some of the front distance measurement means from erroneously measuring the distance to the side wall as the distance to the front obstacle in front of the robot during the rotating operation. Accordingly, it is therefore possible to accurately measure the inclination angle of the front obstacle in front of the robot.

In a preferred embodiment of the present invention, the front distance measurement means includes a plurality of ultrasonic sensors and a plurality of optical sensors, and the ultrasonic sensors and the optical sensors are spaced apart from one another in the width direction of the traveling assembly, respectively, wherein it is determined that the inclination of the front obstacle with respect to the moving direction of the traveling assembly is smaller than a predetermined inclination angle when the ultrasonic sensor detects an obstacle and the optical sensor detects an obstacle, and it is determined that the inclination of the front obstacle with respect to the moving direction of the traveling assembly is larger than the predetermined inclination angle when the ultrasonic sensor detects no obstacle and the optical sensor detects an obstacle.

According to this embodiment, even if the inclination angle of the front obstacle in front of the robot is larger than the predetermined inclination angle and the obstacle cannot be detected by the ultrasonic sensor, the obstacle can be detected by the optical sensor, whereby it is possible to improve the obstacle detection precision. When detecting the front obstacle and measuring the inclination angle of the front obstacle, ultrasonic sensors, which have a higher measurement precision, are primarily used, whereby it is possible to improve the precision for the measurement of the inclination angle of the front obstacle.

In the present invention, it is preferred that when the front distance measurement means includes a plurality of ultrasonic sensors and a plurality of optical sensors, the plurality of optical sensors include a sensor provided inclined at a predetermined inclination angle with respect to the moving direction of the traveling assembly.

Then, it is possible to detect an obstacle diagonally in front of the traveling assembly, thereby further improving the obstacle detection precision.

In a more specific embodiment of the present invention, the "side distance value" is stored in the storage means, wherein the side distance value is the distance to the side obstacle beside the traveling assembly calculated based on a history of measured values obtained by the side distance measurement means. Moreover, the rotation angle of the traveling assembly at the point in time when the difference or the ratio between the measured distances from the plurality of front distance measurement means falls within the predetermined range during the rotating operation for obtaining the inclination angle of the front obstacle in front of the robot is stored as the "inclination angle value", being the inclination angle of the front obstacle, in the storage means, and the measured distance from the front distance measurement means at that point in time is stored as the "front distance value" in the storage means. The control means calculates the positional relationship between the position of the traveling assembly and the position of the intersection point between the front obstacle and the side obstacle based on the "side distance value", the "inclination angle value" and the "front distance value", and controls the traveling operation of the traveling assembly so as to do work on the corner area formed by the front obstacle and the side obstacle based on the positional relationship information.

Thus, it is possible to calculate the positional relationship between a non-right-angled corner area and the current position of the working robot, whereby it is possible to accurately do work on corner areas.

BRIEF DESCRIPTION OF THE DRAWINGS

FIG. 15(a) is a plan view showing the external appearance of the working robot, and FIG. 15(b) is a block diagram showing a control configuration.

FIGS. 24(a) and 24(b) are plan views each showing an operation where the measurement cannot be done only with ultrasonic sensors.

DESCRIPTION OF THE REFERENCE NUMERALS

Figure 1:
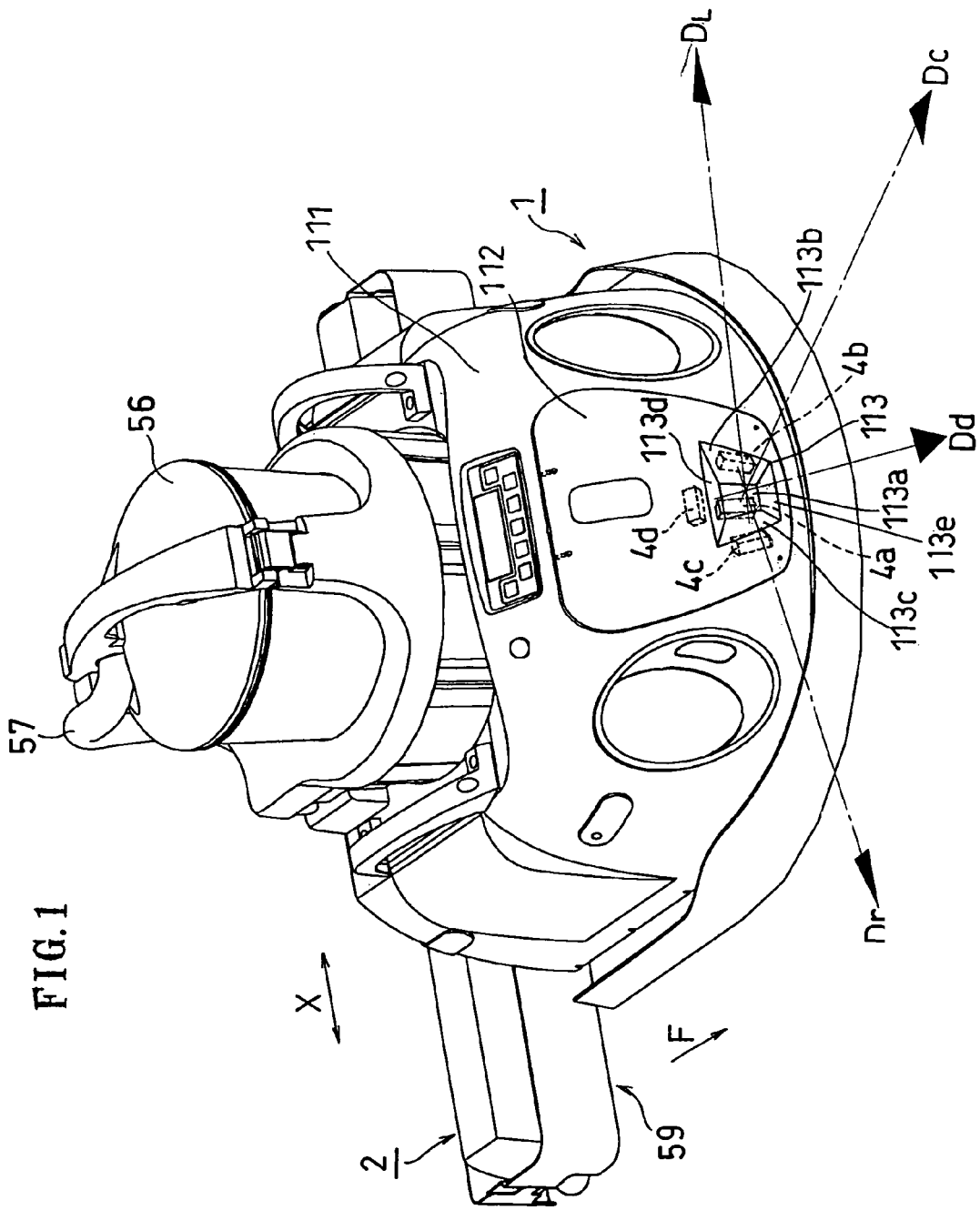
FIG. 1 is a schematic perspective view showing a self-propelled working robot according to the first embodiment of the present invention as viewed diagonally from the front side.

1: Traveling assembly
2: Working assembly
11: Attachment plate (part of moving mechanism)
12: Timing belt (part of moving mechanism)
13: Pulley (part of moving mechanism)
14: Rail (part of moving mechanism)
21(L,R), 22(L,R): Bumpers 30F: Front bar (detection target portion: part of first and second contact sensors)
30B: Rear bar (detection target portion)
4a: First optical sensor (first distance sensor)
4b, 4c: Second optical sensor (second distance sensor)
4d: Third optical sensor (third distance sensor)
112: Protection cover
113: Recess
46: CPU (first and second determination means, changing means)
7: Gyrosensor (rotation angle measurement means)
8: Microcomputer (control means)
3a, 3b: Ultrasonic sensor (side distance measurement means)
3c to 3e: Ultrasonic sensor (front distance measurement means)
17a to 17e: Optical sensor (front distance measurement means)
80: CPU (control means, determination means)
81: Memory (storage means)
θ: Rotation angle
O: Center of rotation (vertical line)
Dc: First measured distance
Dr: Second measured distance
W: Obstacle
β: Inclination angle
SR1, SL1: First detection switch (part of first contact sensor)
SR2, SL2: Second detection switch (part of second contact sensor)

BEST MODE FOR CARRYING OUT THE INVENTION

The present invention will be understood more clearly from the following description of preferred embodiments taken in conjunction with the accompanying drawings. However, the embodiments and the drawings are given for the purpose of mere illustration. The scope of the present invention shall only be defined based on the appended claims. In the accompanying drawings, the same reference numerals denote the same or corresponding components throughout the plurality of figures.

Embodiments of the present invention will now be described with reference to the drawings.

The following embodiments are directed to a case where the self-propelled working robot of the present invention is applied to a self-propelled cleaning robot for sucking up dust from the floor.

Figure 2:
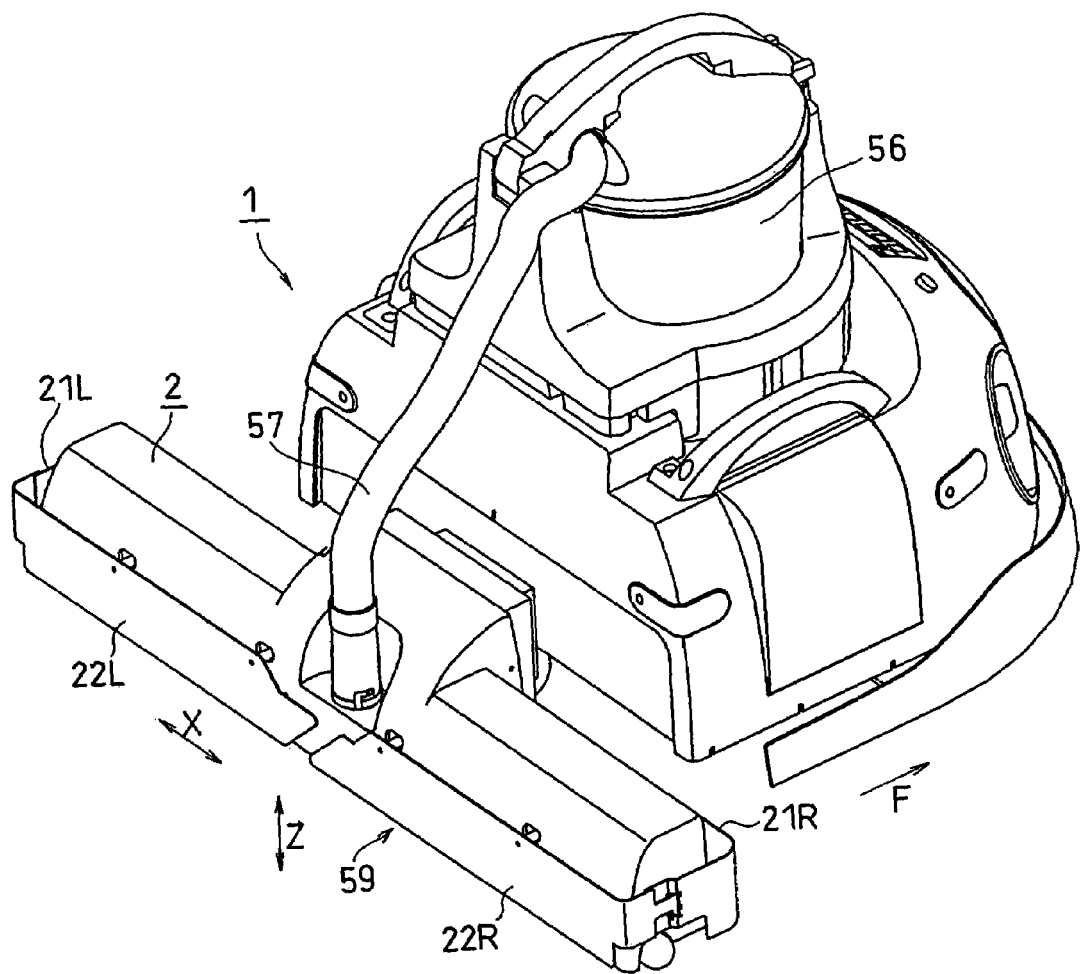
FIG. 2 is a schematic perspective view showing the robot as viewed from diagonally from the rear side.

First Embodiment:

As shown in FIGS. 1 and 2, the self-propelled working robot of the present embodiment includes a carriage-like traveling assembly 1 for self-traveling across the floor surface, and a working assembly 2 for sucking up dust from the floor. The working assembly 2 is provided behind the traveling assembly 1 with respect to the primary moving direction F of the traveling assembly 1.

The suction unit 56 is provided in an upper portion of the traveling assembly 1. The suction unit 56 includes a dust receptacle (tank), a blower motor, a filter, etc. The suction unit 56 and the working assembly 2 are connected to each other via a suction hose 57. A suction hole 59 is provided on the lower surface of the working assembly 2. As the present working robot does cleaning work while traveling around, the dust particles on the floor are sucked up through the suction hole 59 one after another, thereby cleaning the floor surface.

Figure 3:
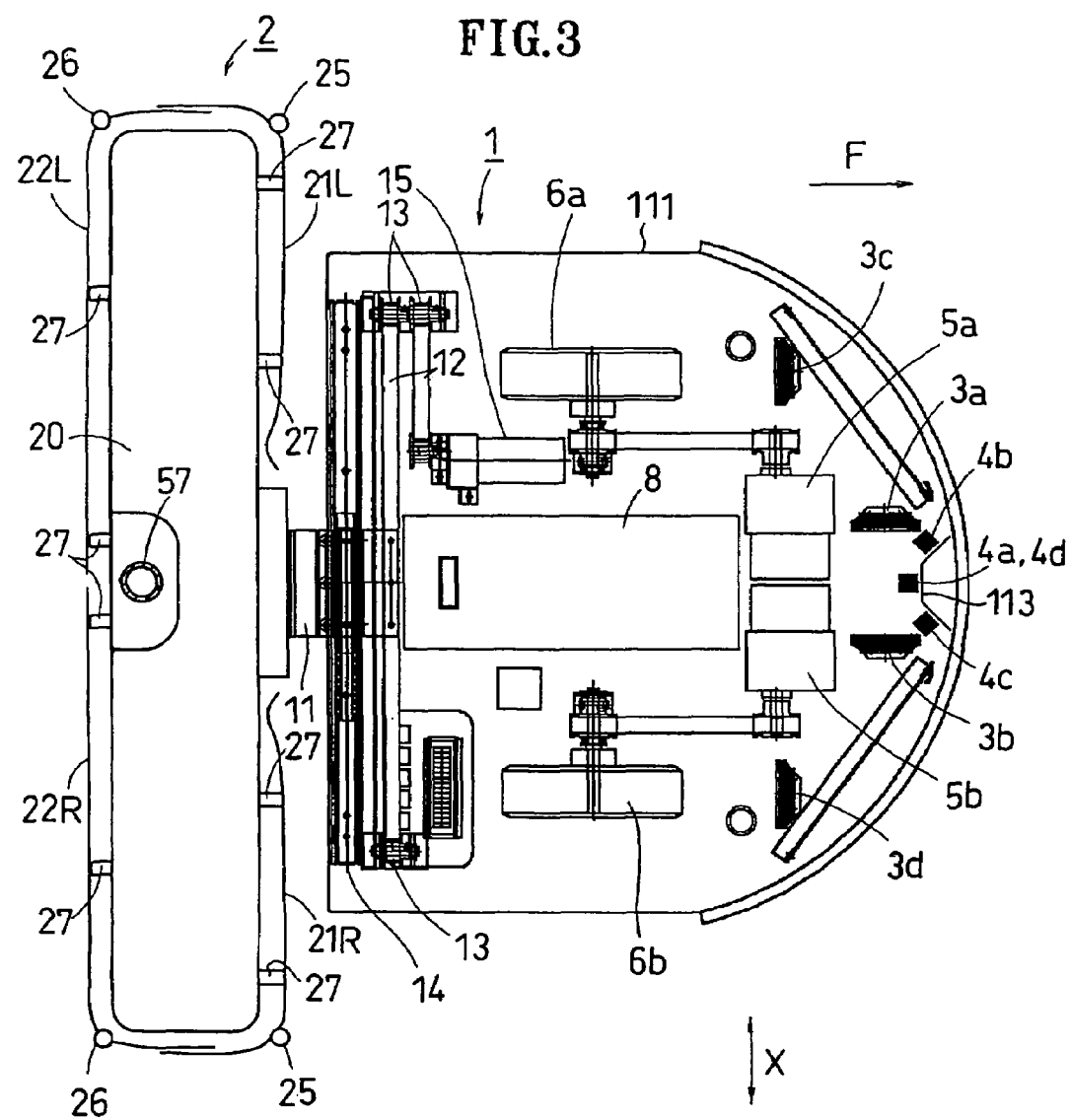
FIG. 3 is a horizontal cross-sectional view showing the present working robot.

Traveling Assembly 1:

As shown in FIG. 3, the traveling assembly 1 includes a pair of driven wheels 6a and 6b for driving the traveling assembly 1 and swivel casters (not shown) generally in the middle of the front portion and the rear portion of the traveling assembly 1. The driven wheels 6a and 6b are driven by drive motors 5a and 5b, respectively. The drive motors 5a and 5b can be spun in opposite directions (reversible). Control means 8 (FIG. 4) controls the travel of the traveling assembly 1.

When traveling straight, the two drive motors 5a and 5b are spun in the same direction so that the traveling assembly 1 can move forward or backward. For a rotating (turning) operation, the two drive motors 5a and 5b are spun in opposite directions, thereby rotating (turning) the robot in place. The traveling assembly 1 can travel along a curve by controlling the ratio between the speeds of the two drive motors 5a and 5b.

The working assembly 2 is provided with an attachment plate 11 for the attachment of a body 20 of the working assembly 2 to the traveling assembly 1. A rail 14 is provided in a rear portion of the traveling assembly 1, extending in the left-right direction X generally perpendicular to the moving direction F. The attachment plate 11 is attached to the rail 14, and is connected to a slide drive motor 15, via a timing belt 12 and a pulley 13. The attachment plate 11 is slid by the slide drive motor 15 left and right along the rail 14. Thus, the attachment plate 11, the timing belt 12, the pulley 13, the rail 14 and the slide drive motor 15 together form a moving mechanism for moving the working assembly 2 left and right with respect to the traveling assembly 1.

Figure 12:
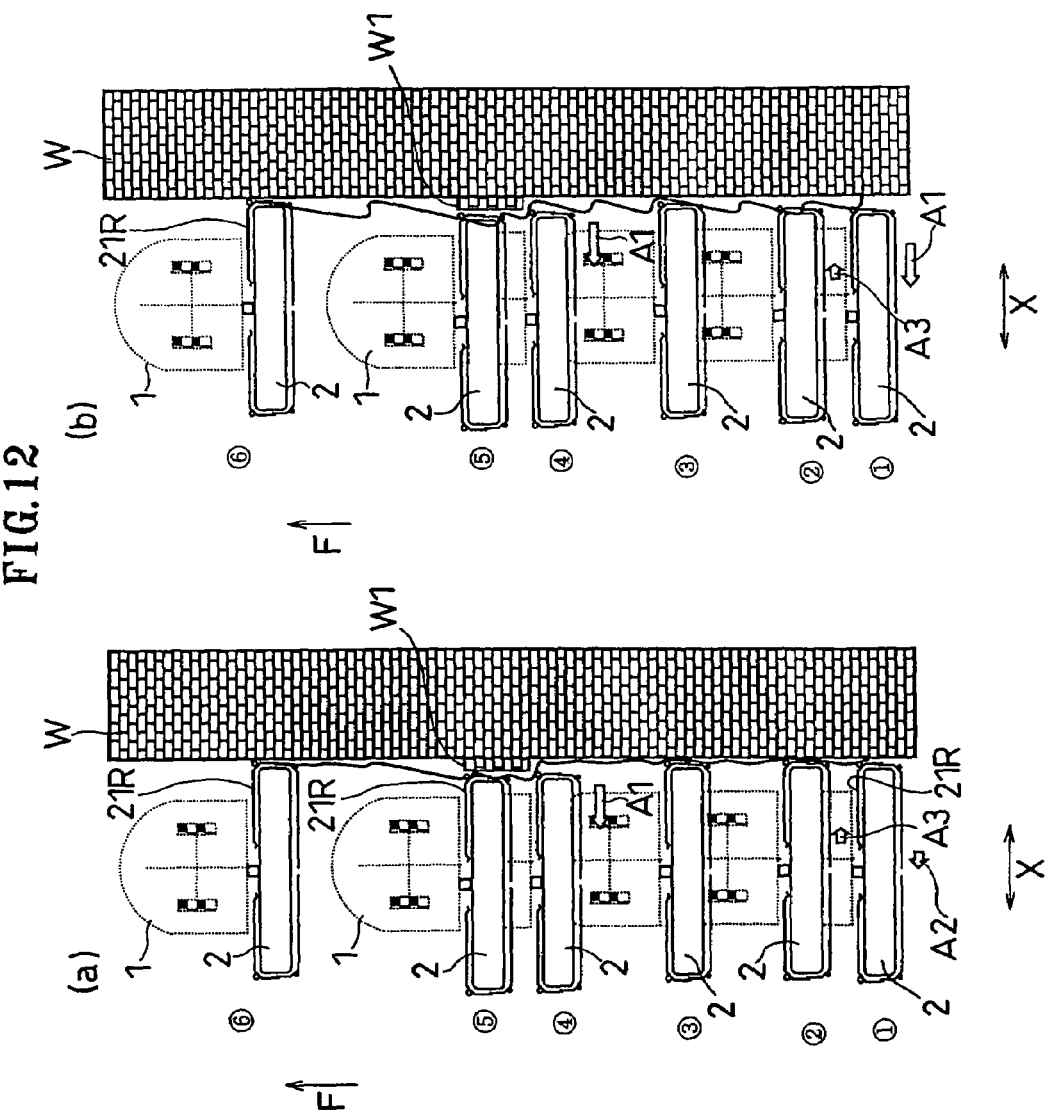
FIG. 12(a) is a plan view showing a method for avoiding an obstacle of the present working robot.
FIG. 12(b) is a plan view showing a comparative example.
Figure 13:
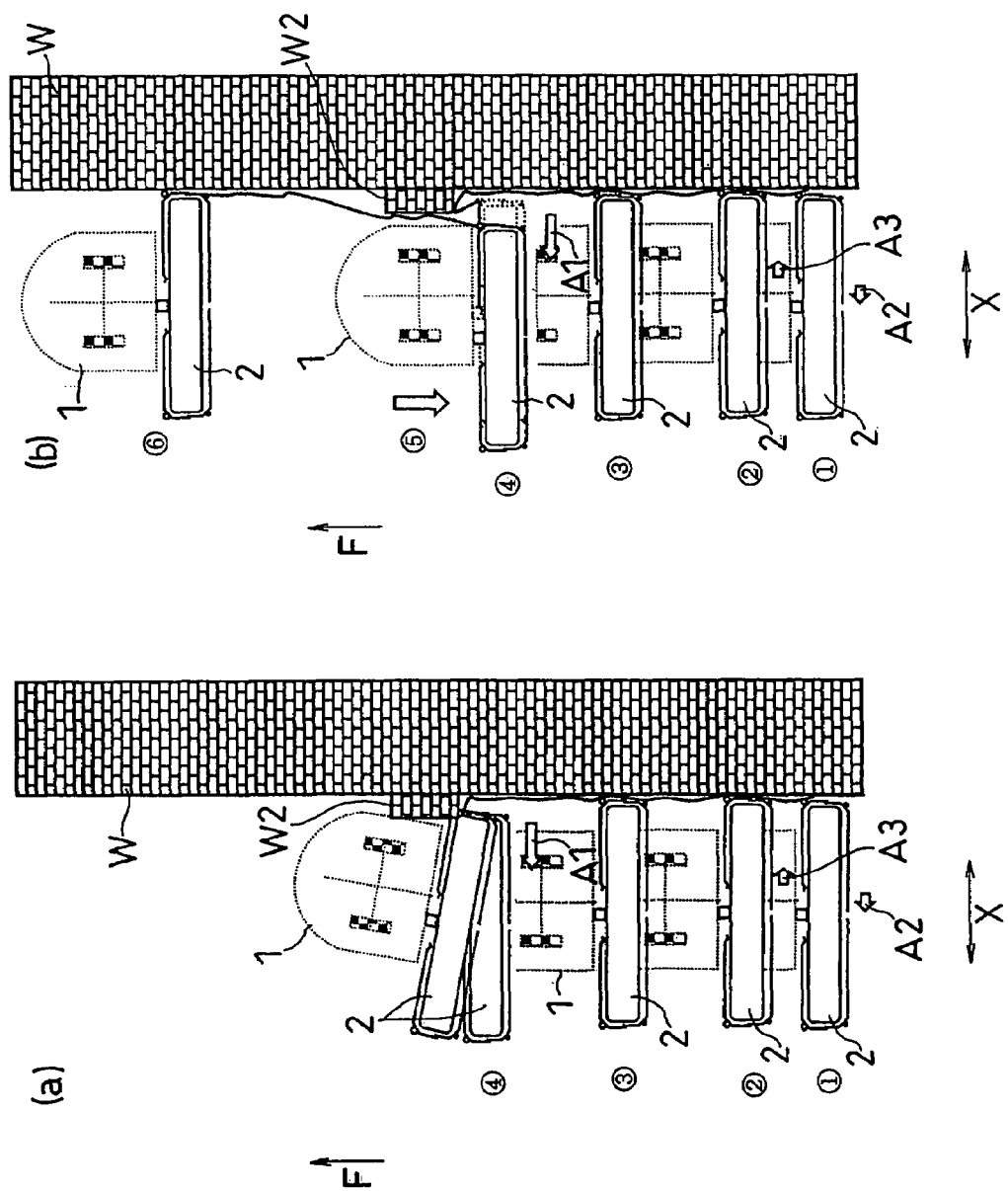
FIG. 13(a) is a plan view showing an avoidance method in a case where the robot is not stopped when it contacts an obstacle.
FIG. 13(b) is a plan view showing an avoidance method in a case where the robot is stopped and moved back.

The working assembly 2 is controlled to move left and right at predetermined times while the present working robot is traveling, whereby the working assembly 2 moves along a wall W as shown in FIGS. 12 and 13.

A plurality of ultrasonic (distance) sensors 3a to 3d and first to third optical (distance) sensors 4a to 4d are provided in a front portion of the traveling assembly 1 of FIG. 3.

The two ultrasonic sensors 3a and 3b, among these sensors, are for measuring the distance to an obstacle on the left or right of the traveling assembly 1. The other ultrasonic sensors 3c and 3d are provided on both sides of the front end portion of a traveling assembly body 111, and the optical sensors 4a to 4d are provided in a central portion of the front end portion. These sensors 3c, 3d and 4a to 4d measure the distance to an obstacle in front of the traveling assembly 1.

Optical Sensors 4a to 4d:

The first optical sensor 4a is provided in the head portion of the robot located at the center of the robot in the left-right direction X. The first optical sensor 4a measures the distance Dc (FIG. 6) to the obstacle W in front of the robot.

The second optical sensors 4b and 4c are provided on the left and right sides of, and close to, the first optical sensor 4a. The second optical sensors 4b and 4c measures the distances Dr and DL (FIG. 6) to obstacles W in front of, and diagonally to the left and right of, the robot.

The third optical sensor 4d of FIG. 1 is provided above the first optical sensor 4a. The third optical sensor 4d measures the distance Dd to a position, in front of, and diagonally below, the third optical sensor 4d.

A protection cover 112 is provided in the head portion of the body 111 of the traveling assembly 1. A recess 113 is formed in the protection cover 112. As shown in FIG. 1, the recess 113 includes side surfaces 113a to 113c that closely face the three sensors, i.e., the first and second optical sensors 4a to 4c. A ceiling surface 113d is formed in the recess 113.

The third optical sensor 4d is provided at an upper position facing the ceiling surface 113d. An optical sensor (not shown) may be provided at a lower position facing a bottom surface 113e for detecting whether or not there is an obstacle in front of and above the robot that the robot will not be able to pass under.

Figure 4:
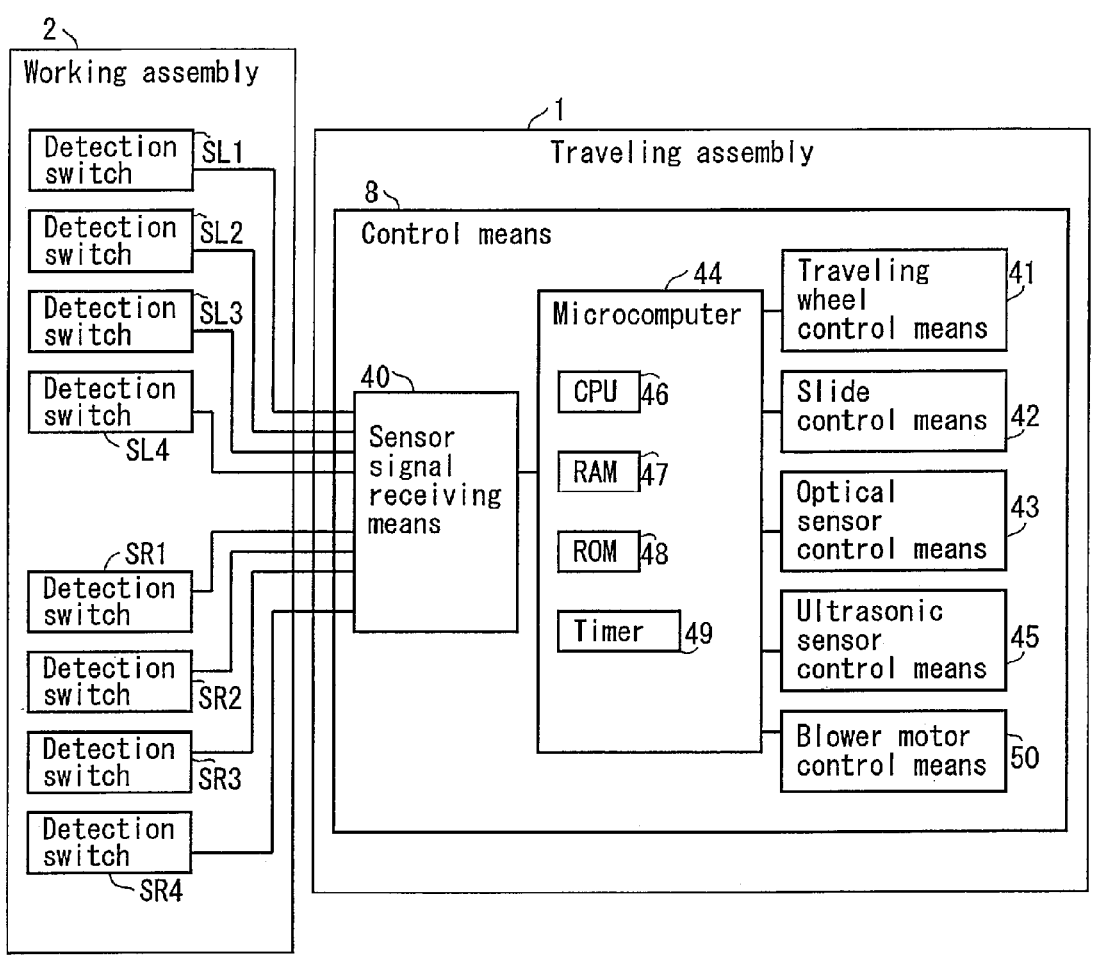
FIG. 4 is a schematic configuration diagram showing a control mechanism of the present working robot.

Control Means:

As shown in FIG. 4, the control means 8 includes sensor signal receiving means 40, traveling wheel control means 41, slide control means 42, optical sensor control means 43, ultrasonic sensor control means 45, blower motor control means 50 and a microcomputer 44.

The various means 40 to 43, 45 and 50 are connected to a microcomputer 44 via various interfaces (not shown). The microcomputer 44 includes a CPU 46, a RAM 47, a ROM 48 and a timer 49 for keeping the time. Retraction speeds A1 to A3, to be described later, and various threshold values, etc., to be pre-stored in the ROM 48.

The sensor signal receiving means 40 is connected to detection switches (part of a contact sensor) SL1 to SL4 and SR1 to SR4, being optical sensors, for example, and provided in the working assembly 2.

The traveling wheel control means 41 controls the spinning of the drive motors 5a and 5b of FIG. 3 to thereby control the travel of the traveling assembly 1.

The slide control means 42 (FIG. 4) controls the spinning of the slide drive motor 15 to thereby control the moving mechanism of the working assembly 2.

The sensor control means 43 and 45 (FIG. 4) controls the plurality of ultrasonic sensors 3a to 3d and the optical sensors 4a to 4d.

Obstacle Detection:

Also pre-stored in the ROM 48 (FIG. 4) are patterns in which the traveling assembly 1 travels, first and second threshold values SHc and SHr to be described later, a stop distance DrO to be described later, various numerical expressions, etc.

Figure 5:
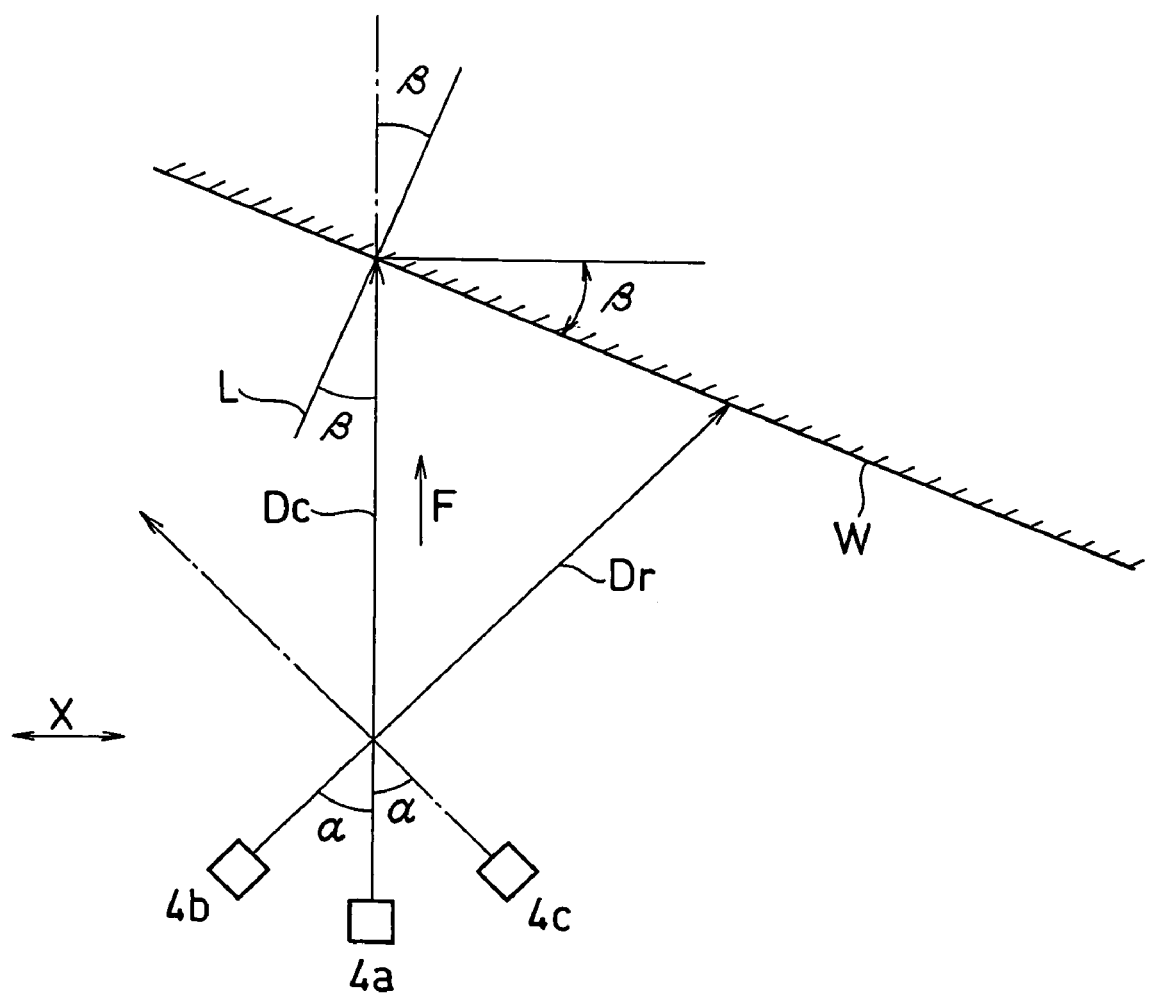
FIG. 5 is a schematic view showing the principle of detecting an obstacle.

The CPU (first determination means) 46 (FIG. 4) performs a first determination operation of comparing the first measured distance Dc to the obstacle W of FIG. 5 obtained by the first optical sensor 4a with the first threshold value SHc to determine the proximity of the obstacle W. The CPU (second determination means) 46 also performs a second determination operation of comparing the second measured distance Dr ($D_L$) to the obstacle W obtained by the second optical sensor 4b (4c) with the second threshold value SHr to determine the proximity of the obstacle W.

If one of the two determination means determines that the obstacle is proximate, the CPU 46 concludes that the robot is proximate to the obstacle. When the CPU 46 concludes that the obstacle W is proximate, the CPU 46 may avoid the collision with the obstacle W by performing a control operation on the traveling assembly 1, such as decelerating, stopping, turning (rotating), changing the direction of, moving back the traveling assembly 1, or by performing some of these control operations in combination. Alternatively, the robot may decelerate and travel along the wall.

Principle Of Detecting Obstacles W:

The principle of detecting the obstacle W of the present invention will now be described.

Figure 6:
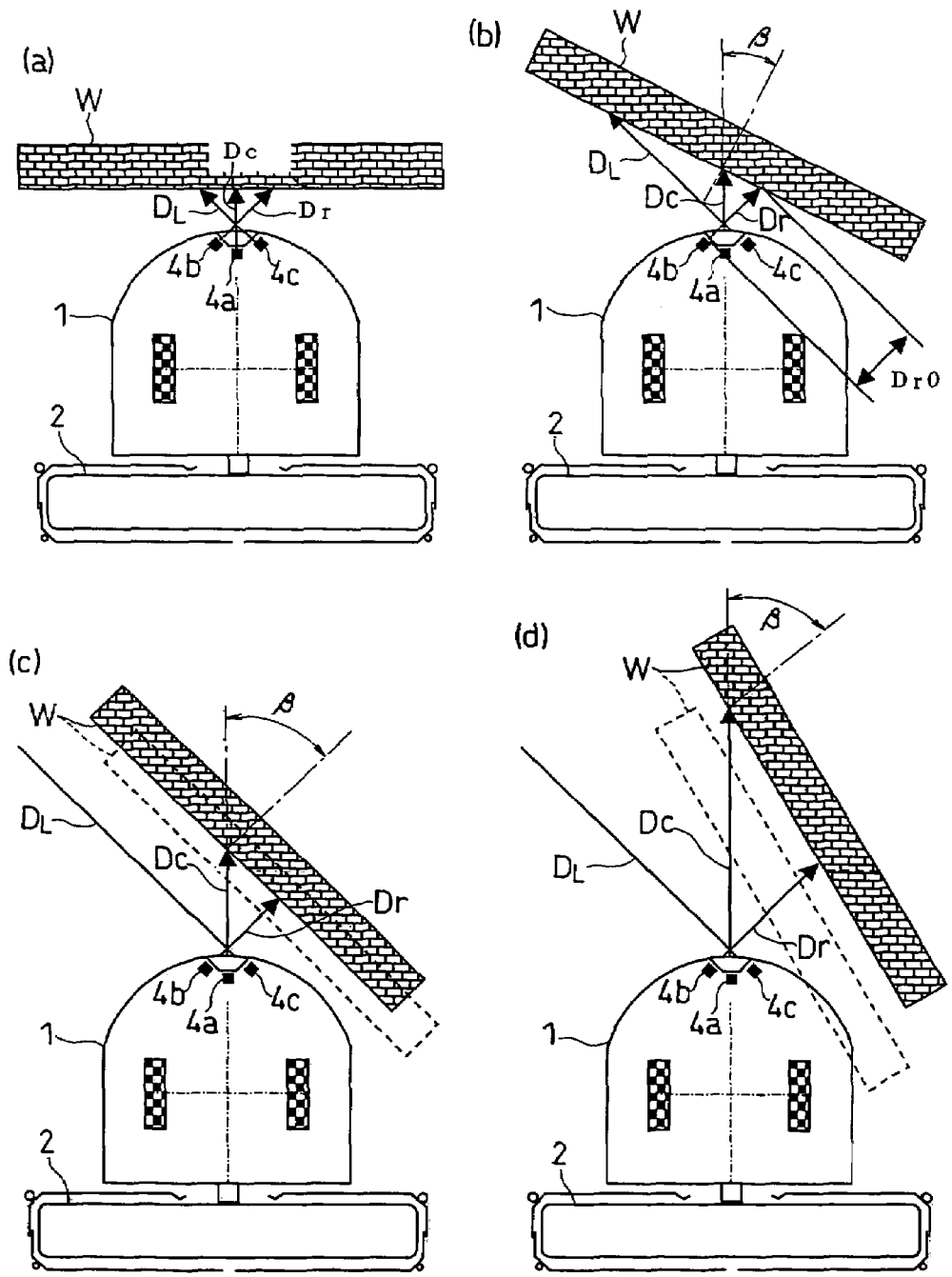
FIG. 6 is a schematic plan view showing a method for detecting an obstacle.

As shown in FIGS. 6(*c*) and 6(*d*), where the obstacle W has a large inclination angle β, a side portion of the front end portion of the traveling assembly 1 may collide with the obstacle W when using only the first determination operation by the first optical sensor 4a. In view of this, the present robot uses the first and the second determination operation depending on the inclination angle β so that it is possible to determine whether or not the obstacle W is proximate irrespective of the inclination angle β.

Specifically, where, as shown in FIG. 6(a), the inclination angle β is smaller than a predetermined reference angle, it is determined whether or not the robot has come proximate to the obstacle W while enabling the determination result of the first determination means. Where, as shown in FIGS. 6(c) and 6(d), the inclination angle β is larger than the reference angle, it is determined whether or not the robot has come proximate to the obstacle W while enabling the determination result of the second determination means.

For example, in the present embodiment, the value of the reference angle is determined as follows.

As shown in FIG. 5, light (parallel beam) from the first optical sensor 4a is emitted generally in parallel to the primary moving direction F of the present robot.

The light emitting directions for light from the second optical sensors 4b and 4c provided on the sides are set to be at predetermined installation angles α and α, respectively, with respect to the light emitting direction for light from the first optical sensor 4a. Thus, when the inclination angle β of the obstacle W is ½ the installation angle α, the first measured distance Dc of the first optical sensor 4a is equal to the second measured distance Dr ($D_L$) of the second optical sensor 4b (4c).

In the present embodiment, the reference angle is set to ½ the installation angle α, and where the inclination angle β is smaller than the reference angle, i.e., where the first measured distance Dc is smaller than the second measured distance Dr (e.g., FIG. 6(a)), it is determined whether or not the obstacle W is proximate based on the determination result of the first determination operation. Where the inclination angle β is smaller than the reference angle (where Dc<Dr), since the first determination means first detects the proximity of the obstacle W before the second determination means, the CPU 46 concludes that the obstacle W is proximate when the first measured distance Dc is less than or equal to the first threshold value SHc.

Where the inclination angle β is greater than or equal to the reference angle, i.e., where the first measured distance Dc is greater than or equal to the second measured distance Dr (e.g., FIGS. 6(b) to 6(d)), since the second determination means first detects the proximity of the obstacle W before the first determination means, the conclusion whether or not. the obstacle W is proximate is made based on the determination result of the second determination operation.

If the second threshold value SHr is a fixed value, side portions of the front end portion may collide with the obstacle W in a case where the inclination angle β of the obstacle W is significantly large as shown in FIG. 6(d). In view of this, preferably, the second threshold value SHr is increased as the inclination angle β of FIG. 5 increases. Thus, as will be described below, the second threshold value SHr is increased as the inclination angle β of the obstacle W increases.

A method for changing the second threshold value SHr in cases where the inclination angle β is greater than or equal to the reference angle (where Dc≧Dr) will now be described.

A method for changing the second threshold value SHr may be to change the second threshold value SHr according to the ratio or the difference between the first measured distance Dc and the second measured distance Dr. For example, when the difference (Dc−Dr) is large, the second threshold value SHr may be increased according to the magnitude of the difference. When the ratio (Dc/Dr) is large, the second threshold value SHr may be increased according to the ratio.

An example where a method based on the difference between the first measured distance Dc and the second measured distance Dr is used as the method for changing the second threshold value SHr will now be described.

The CPU 46 calculates the second threshold value SHr using Expression (11) below.

$$SHr = Dr0 - (Dr - Dc) \tag{11}$$

Herein, DrO is the stop reference value of Dr when Dr=Dc, and is a value predetermined based on the sensor arrangement and the size and shape of the present robot.

The CPU 46 calculates the second threshold value SHr based on Expression (11) above, and compares the second threshold value SHr with the second measured distance Dr.

For example, where Dr=Dc (where the inclination angle β of the obstacle W is ½ the installation angle α) as shown in FIG. 6(b), the second threshold value SHr is equal to the stop reference value Dr0.

Where the inclination angle β of the obstacle W is larger than α/2 as shown in FIG. 6(c), Dr<Dc. Therefore, the second threshold value SHr is set to be larger than the stop reference value Dr0 according to Expression (11) above.

Where the inclination angle β of the obstacle W is significantly large as shown in FIG. 6(d), Dr<<Dc. Therefore, the second threshold value SHr is set to be even larger according to Expression (11) above.

The CPU 46 compares the second measured distance Dr with the second threshold value SHr, and determines that the robot has come proximate to the obstacle W if the second measured distance Dr is less than or equal to the second threshold value SHr.

As described above, where the inclination angle β of the obstacle W is larger than the reference angle, the second threshold value SHr is changed based on a predetermined numerical expression so that the second threshold value SHr increases as the inclination angle β increases. Therefore, even if the inclination angle β is significantly large, it is possible to reliably detect the obstacle W before the side portion of the front end portion of the robot contacts the obstacle W.

For calculating the second threshold value SHr, any of various numerical expressions may be used depending on the shape and size, the traveling speed, etc., of the present robot. In addition to Expression (11) above, SHr=Dr0−(Dr−Dc)/2 may be used as the numerical expression, for example.

In the above embodiment, where the inclination angle β is large, it is determined whether or not the obstacle W is proximate based on the determination result from the second determination means. An alternative embodiment may employ a method in which the determination is always based on the first determination means while the first threshold value SHc is increased as the inclination angle β of the obstacle W increases.

The numerical expression used in such an alternative embodiment may be Expression (12) below, for example.

$$SHc = DR0 - (Dr - Dc) \times 1.5 \tag{12}$$

Then, the first threshold value SHc is increased as the inclination angle β of the obstacle W increases as shown in FIGS. 6(b) to 6(d). Therefore, even if the inclination angle β of the obstacle W is large, it is possible to detect the proximity of the obstacle W by using the determination result from the first determination means.

However, the distance sensor typically has a better measurement precision as the measurement distance is smaller. Therefore, it is typically preferred that the second determination means with a smaller measurement distance is used in cases where the inclination angle is large as in the present embodiment. Note however that the measurement precision may decrease when the measurement distance is less than or equal to a certain distance depending on the type of the distance sensor. In such a case, it is more preferred that the determination always is made by the first determination means while the first threshold value SHc is increased as the inclination angle of the obstacle decreases.

The first and second optical sensors (distance sensors) may be provided on side portions of the front surface of the working robot. In such a case, there is needed only one second optical sensor for measuring the distance to an obstacle outwardly and diagonally in front of the robot body.

Working Assembly 2:

As shown in FIG. 3, the working assembly 2 has a rectangular shape as seen in a plan view. The width of the working assembly 2 in the left-right direction is larger than the width of the traveling assembly 1 in the left-right direction X. Therefore, the working assembly 2 is protruding from the left side and the right side of the traveling assembly 1. The working assembly 2 includes the body 20, and a bumper part composed of bumpers 21(L,R) and 22(L,R) surrounding the body 20. The bumper part is divided in the left-right direction and in the front/rear direction into bumpers 21(L,R) and 22(L,R). The bumpers 21L, 22L and 21R, 22R are provided in mirror symmetry with respect to the center in the left-right direction X generally perpendicular to the moving direction F of the present working robot.

As shown in FIG. 2 (and FIG. 7), the bumpers 21(L,R) and 22(L,R) are continuous around the four corner portions. The bumper part is divided in the front surface, the rear surface and the two side surfaces into separate pieces. The rear bumpers 22L and 22R are separated from each other generally at the center in the left-right direction X of the working assembly 2. The separated portions of the rear bumpers 22L and 22R are generally parallel to each other and slanted with respect to the up/down direction Z.

Figure 7:
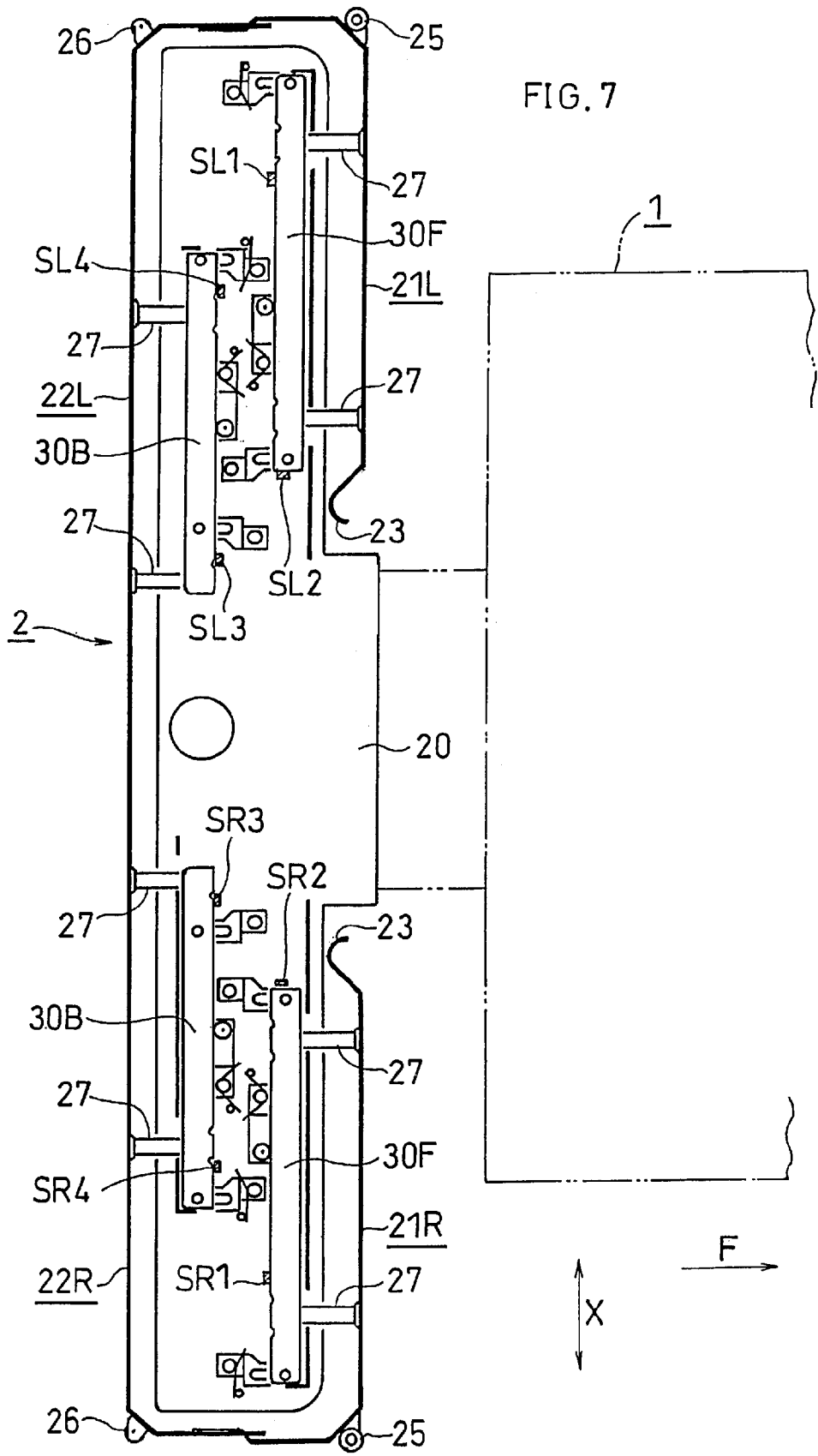
FIG. 7 is a horizontal cross-sectional view showing a working assembly.

As shown in FIG. 7, first and second rollers 25 and 26 are provided respectively at the front-side corner portions and at the rear-side corner portions of the bumpers 21 and 22. The rollers 25 and 26 are not shown in FIGS. 1 and 2.

Figure 8:
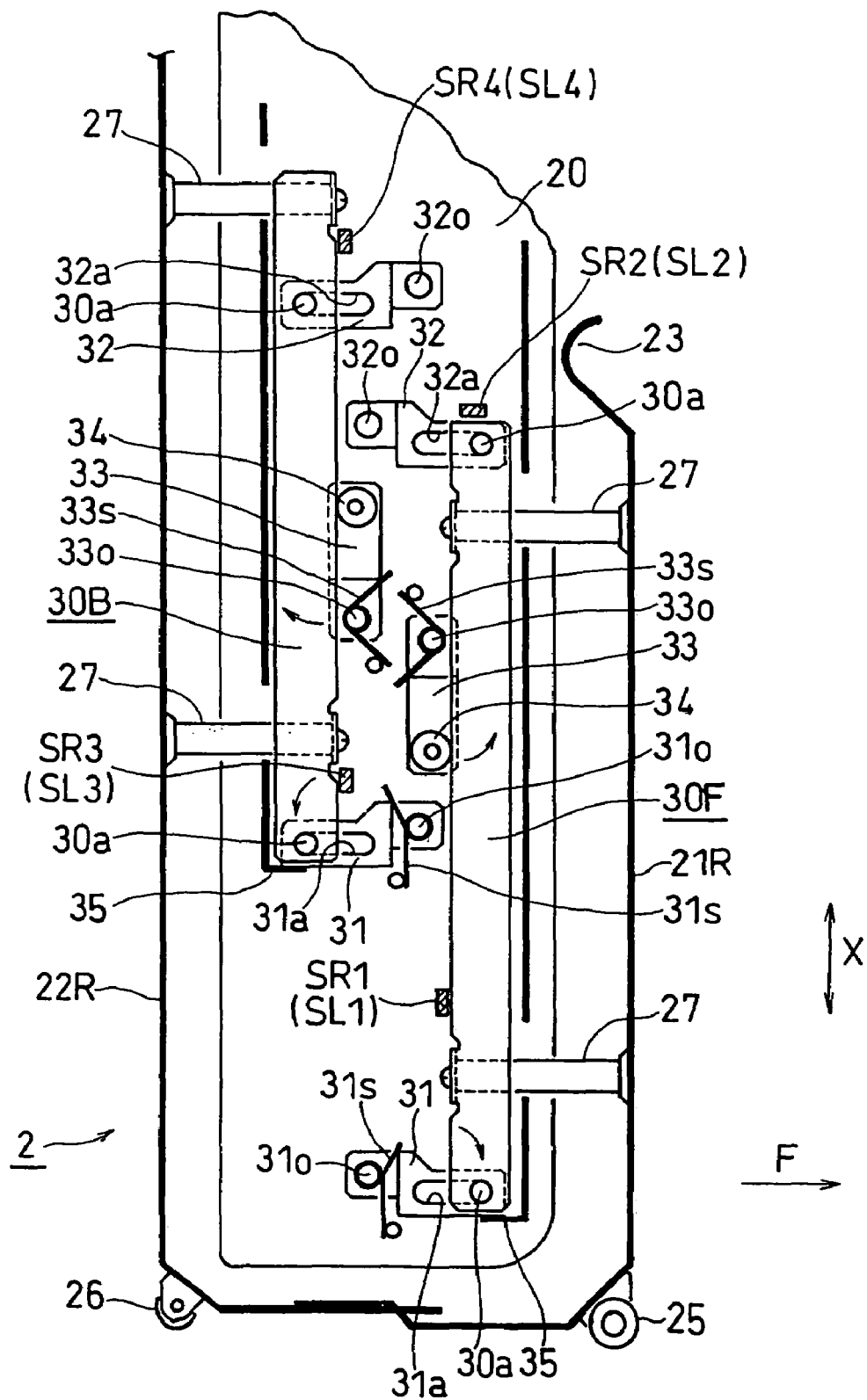
FIG. 8 is a horizontal cross-sectional view showing a right-side portion of the working assembly.

Front Bar 30F:

FIG. 8 is a horizontal cross-sectional view showing a right-side portion of the working assembly 2.

As shown in FIG. 8, the front right bumper 21R is supported by a front bar (detection target portion) 30F, extending in the left-right direction X along the front right bumper 21R, via brackets 27. The front bar 30F is attached to the working assembly body 20 via the first and second arms 31 and 32.

Bumper Supporting Mechanism:

The first and second arms 31 and 32 are provided at the left and right end portions of the front bar 30F. The first and second arms 31 and 32 are attached to the working assembly body 20 pivotably about pivot shafts 31o and 32o. Elongate holes 31a and 32a are formed in the first and second arms 31 and 32. Slider portions 30a and 30a slidable along the elongate holes 31a and 32a are formed at the left and right end portions of the front bar 30F. Thus, the front bar 30F is supported via the first and second arms 31 and 32 so that it is movable in the front-rear, left-right and diagonal directions with respect to the working assembly body 20 (FIGS. 9(a) to 9(c)).

Figure 9:
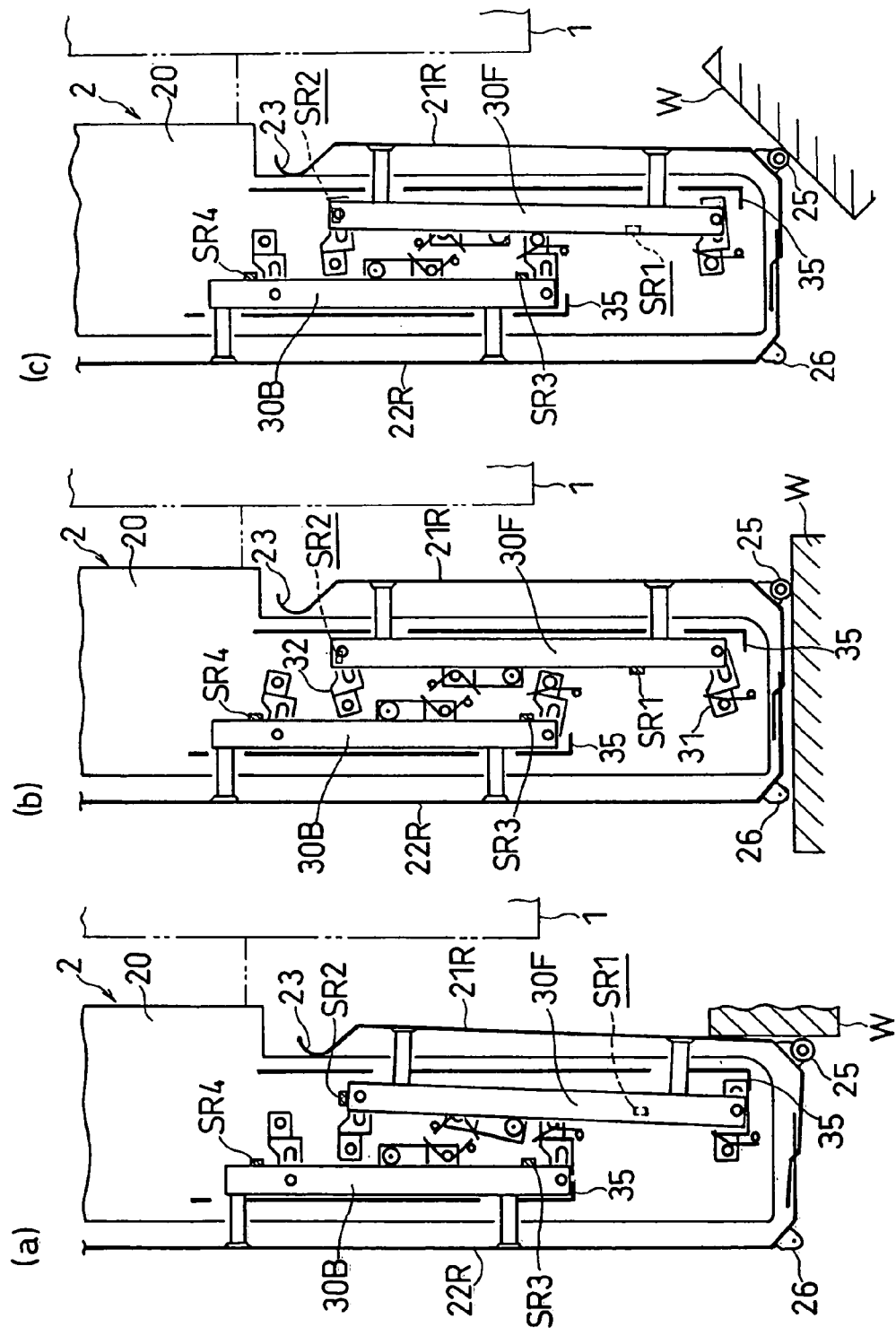
FIGS. 9(a) to 9(c) are horizontal cross-sectional views each showing a method for detecting an obstacle.

A left end portion 23 of the front right bumper 21R is bent backward. Therefore, when the front surface or a front corner portion of the front right bumper 21R contacts the obstacle W, as shown in FIGS. 9(a) and 9(c), the end portion 23 contacts the working assembly body 20 and the front right bumper 21R slightly pivots about the end portion 23.

Positioning Mechanism:

As shown in FIG. 8, a spring 31s is wound around the pivot shaft 31o of the right-side first arm 31. The front bar 30F is urged by the spring force of the spring 31s to the right as indicated by an arrow.

A stopper 35 is fixed to the working assembly body 20. With the first arm 31 being in contact with the stopper 35, the front bar 30F is positioned at a predetermined right-end position.

A third arm 33 for urging the front bar 30F in the moving direction F is provided in the working assembly body 20. The third arm 33 is provided pivotably about the pivot shaft 33o with respect to the working assembly body 20. A roller 34, which is in contact with a rear end portion of the front bar 30F, is provided at an end portion of the third arm 33. By the spring force of a spring 33s wound around the pivot shaft 33o, the roller 34 urges the rear end portion of the front bar 30F in the forward direction F.

With the slider portions 30a and 30a being in contact with the front end portion of the elongate holes 31a and 32a of the first and second arms 31 and 32, the front bar 30F is positioned at the end portion in the moving direction F.

First And Second Right Detection Switches SR1 and SR2:

The working assembly body 20 is provided with the first and second right detection switches SR1 and SR2 for detecting the position of the front bar 30F. The first right detection switch SR1 is provided at a position corresponding to a right-side position of the rear end portion of the front bar 30F. The second right detection switch SR2 is provided at a position corresponding to the left end of the front bar 30F.

For example, as shown in FIG. 9(a), if the front surface of the front right bumper 21R contacts the obstacle W while moving forward, the front bar 30F moves back and to the right. Then, the first right detection switch SR1 is shaded by the front bar 30F, thereby detecting the front bar 30F. Thus, the first right detection switch SR1 (SL1) and the front bar 30F together form a first contact sensor for detecting the front surface of the working assembly 2 contacting the obstacle W.

As shown in FIG. 9(b), if the obstacle W contacts the side surface of the front right bumper 21R via the first roller 25, the front bar 30F moves to the left. Then, the second switch SR2 is shaded by the front bar 30F, thereby detecting the front bar 30F. Thus, the second right detection switch SR2 (SL2) and the front bar 30F together form a second contact sensor for detecting the side surface of the working assembly 2 contacting the obstacle W.

As shown in FIG. 9(c), if the obstacle W contacts a front right corner portion of the front right bumper 21R via the first roller 25, the front bar 30F moves diagonally backward left. Then, the first and second right detection switches SR1 and SR2 both detect the front bar 30F.

As shown in FIG. 7, the first and second left detection switches SL1 and SL2 provided in the left-side portion of the working assembly 2 are arranged in mirror symmetry with the first and second right detection switches SR1 and SR2, respectively. Thus, there is a following correlation between detection signals from the first and second, right and left detection switches SR1, SR2, SL1 and SL2 and the portion of the working assembly which is in contact with the obstacle when moving forward.

Only SR1: front left surface of the working assembly is in contact (FIG. 9(a))

Only SR2: right side surface of the working assembly is in contact (FIG. 9(b))

SR1 and SR2: front right corner portion of the working assembly is in contact (FIG. 9(c))

Only SL1: front left surface of the working assembly is in contact

Only SL2: left side surface of the working assembly is in contact

SL1 and SL2: front left corner portion of the working assembly is in contact

Rear Bar 30B:

As shown in FIG. 8, the rear right bumper 22R is supported by a rear bar (detection target portion) 30B, extending in the left-right direction X along the rear right bumper 22R, via the brackets 27. The moving mechanism and the positioning mechanism for the rear bar 30B are similar to those for the front bar 30F. Therefore, similar components are denoted by the same reference numerals, and will not be further described below.

Thus, each of the divided bumpers 21(L,R) and 22(L,R) is positioned by the stopper 35 at a predetermined position while being urged by the spring force outwardly so that it can retract inwardly when contacted by the obstacle W.

Third and Fourth Right Detection Switches SR3 and SR4:

The working assembly body 20 is provided with the third and fourth right detection switches SR3 and SR4 for detecting the position of the rear bar 30B. The third right detection switch SR3 is provided at a position corresponding to a right-side position of the front end portion of the rear bar 30B. The fourth right detection switch SR4 is provided at a position corresponding to a left-side position of the front end portion of the rear bar 30B.

Figure 10:
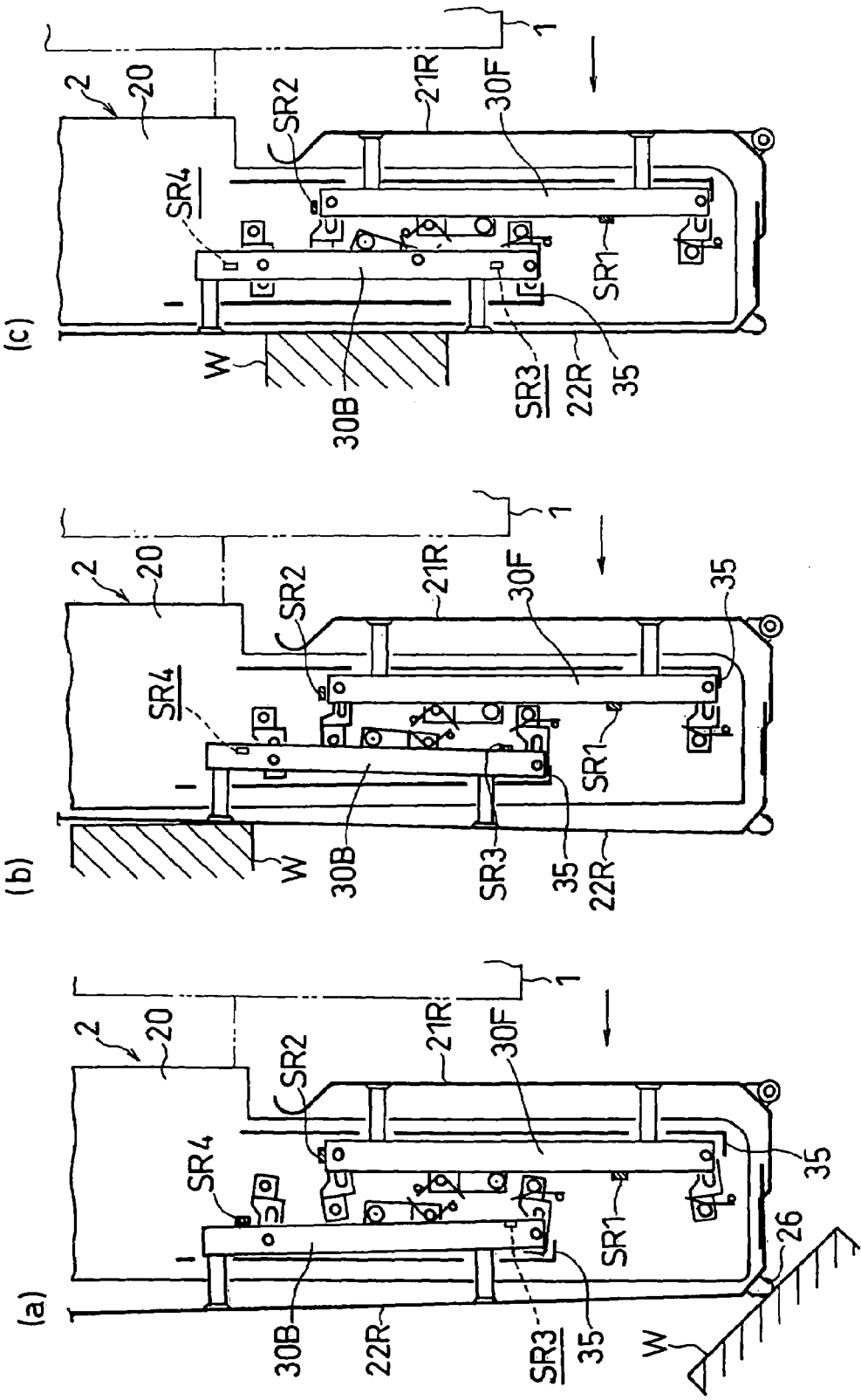
FIGS. 10(a) to 10(c) are horizontal cross-sectional views each showing a method for detecting an obstacle.

For example, as shown in FIG. 10(a), if a rear right corner portion of the rear right bumper 22R contacts the obstacle W via the rear second roller 26 while moving backward, the right end of the rear bar 30B moves forward, whereby the third right detection switch SR3 detects the rear bar 30B.

As shown in FIG. 10(b), if the obstacle W contacts a portion near the left end of the rear right bumper 22R, i.e., a portion to the right of the central portion of the working assembly 2, the left end of the rear bar 30B moves forward, whereby the fourth right detection switch SR4 detects the rear bar 30B.

As shown in FIG. 10(c), if the obstacle W contacts a portion near the central portion of the rear right bumper 22R, i.e., the right side of the working assembly 2, the rear bar 30B moves forward, whereby the third and fourth right detection switches SR3 and SR4 both detect the rear bar 30B.

The third and fourth left detection switches SL3 and SL4 provided in the left-side portion of the working assembly body 20 are arranged in mirror symmetry with the third and fourth right detection switches SR3 and SR4, respectively. Thus, there is a following correlation between detection signals from the third and fourth, right and left detection switches SR3, SR4, SL3 and SL4 and the portion of the working assembly which is in contact with the obstacle when moving backward.

Only SR3: rear right corner portion is in contact (FIG. 10(a))

Only SR4: portion to the right of the central portion of the working assembly 2 is in contact (FIG. 10(b))

SR3 and SR4: portion near the right side of the working assembly 2 is in contact (FIG. 10(c))

Only SL3: rear left corner portion of the working assembly is in contact

Only SL4: portion to the left of the central portion of the working assembly 2 in contact contact SL3 and SL4: portion near the left side of the working assembly 2 contacted Avoidance Operation:

As described above, the CPU 46 receives detection signals from the detection switches SR1 to SR4 and SL1 to SL4 via the sensor signal receiving means 40, whereby it is possible to determine, in detail, which part of the bumpers 21(L,R) and 22(L,R) has contacted the obstacle W when moving forward or backward. The CPU 46 performs various avoidance operations based on the detection signals.

Avoidance operations where the front surface or the side surface of the working assembly 2 contacts the obstacle W while the present working robot is moving forward will now be described.

Figure 11:
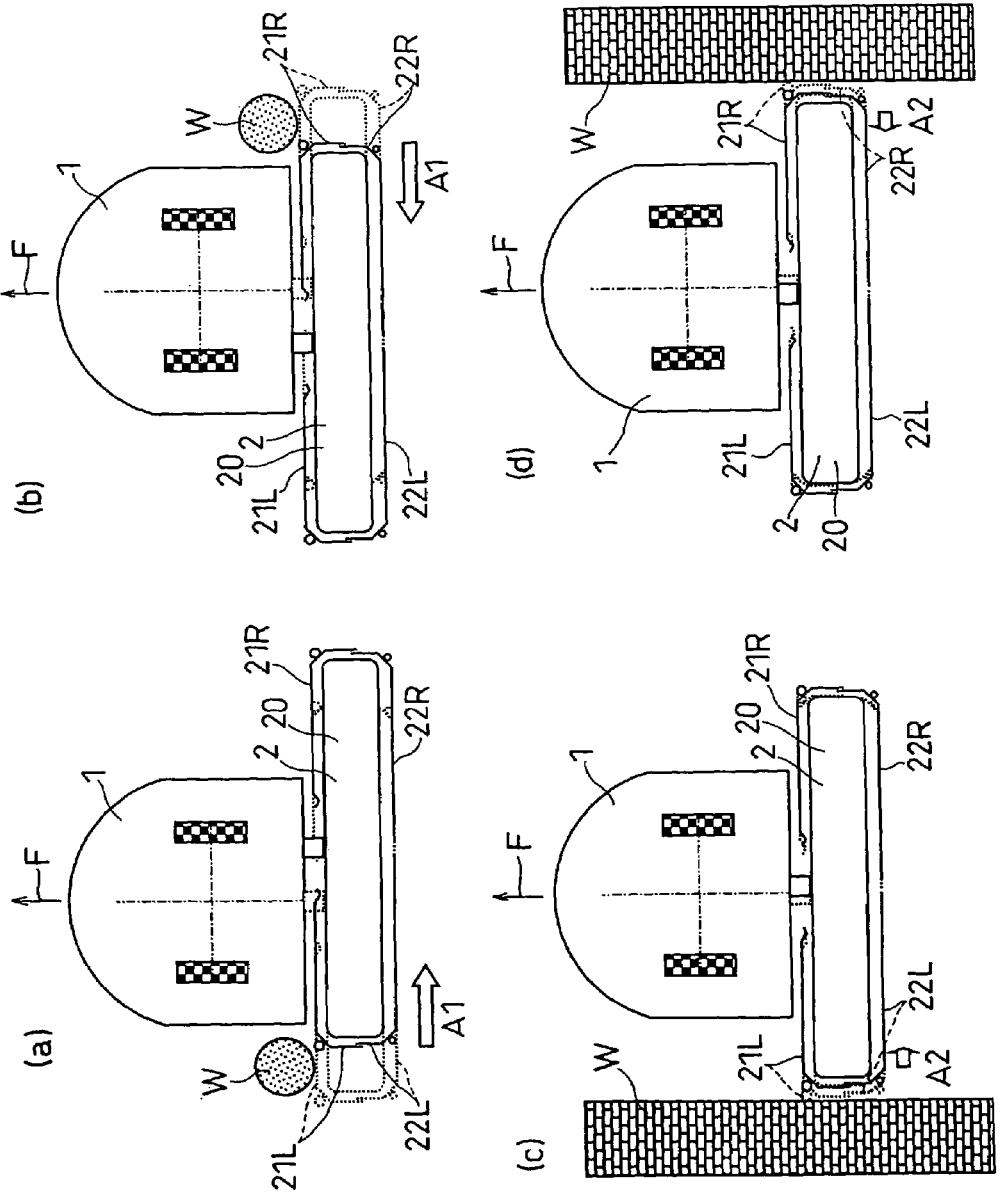
FIGS. 11(a) to 11(d) are plan views each showing a method for avoiding an obstacle.

As shown in FIG. 11(a), if the front surface of the front left bumper 21L contacts the obstacle W, the CPU 46 receives a detection signal from the first left detection switch SL1 (FIG. 7), and moves the working assembly 2 to the right at the first retraction speed A1.

As shown in FIG. 11(b), if the front surface of the front right bumper 21R contacts the obstacle W, the CPU 46 receives a detection signal from the first right detection switch SR1 (FIG. 7),. and moves the working assembly 2 to the left at the first retraction speed A1.

As shown in FIG. 11(c), if the left side surface of the front left bumper 21L contacts the obstacle W, the CPU 46 receives a detection signal from the second detection switch SL2 (FIG. 7), and moves the working assembly 2 to the right at the second retraction speed A2, which is lower than the first retraction speed A1.

As shown in FIG. 11(d), if the right side surface of the front right bumper 21R contacts the obstacle W, the CPU 46 receives a detection signal from the second right detection switch SR2 (FIG. 7), and moves the working assembly 2 to the left at the second retraction speed A2.

The first retraction speed A1 is preferably about 1 m/sec to 3 m/sec, for example. The second retraction speed A2 is preferably about 10 cm/sec to 30 cm/sec, for example.

FIG. 12(a) shows a case where the present working robot is controlled to travel along the wall while employing the control method as described above. A case where the obstacle W is present on the right side of the present working robot will now be described.

A protruding portion W1 is protruding to the left at a point along the obstacle (wall) W. In the initial state, the working assembly 2 is substantially centered in the left-right direction X.

(1): When the traveling assembly 1 starts traveling, and the first roller 25 on the side surface of the front right bumper 21R contacts the obstacle W, a detection signal is transmitted from the second detection switch SR2 (the state of FIG. 9(b)). When the CPU 46 receives the detection signal from the second detection switch SR2, the CPU 46 activates the slide drive motor 15 (FIG. 3) via the slide control means 42 to move the working assembly 2 to the left at the second, lower, retraction speed A2 (FIG. 11(d)).

(2): Since the working assembly 2 has moved to the left, the detection signal is no longer transmitted from the second detection switch SR2. When the CPU 46 stops receiving the detection signal, the CPU 46 immediately starts moving the working assembly 2 toward the original position at the return speed A3, which is even lower than the second retraction speed A2.

(3): The robot moves forward along the wall W while repeating the same operation as that in (1) and (2).

(4): When the front right portion of the front right bumper 21R contacts the protruding portion W1 of the obstacle W, a detection signal is transmitted from the first detection switch SR1 (the state of FIG. 9(a)). When the CPU 46 receives the detection signal from the first detection switch SR1, the CPU 46 moves the working assembly 2 quickly to the left at the first retraction speed A1 so as to move the robot forward while avoiding the protruding portion W1 of the obstacle W (FIG. 11(b)).

(5), (6): The robot moves forward while repeating the same operation as that in (1) and (2).

FIG. 12(b) shows a comparative example.

In the comparative example of FIG. 12(b), when the side surface of the front right bumper 21R contacts the obstacle W, the working assembly 2 is moved quickly at the first retraction speed A1 ((1) in FIG. 12(b)). Therefore, in this comparative example, the working assembly 2 comes too far away from the obstacle W, and the amount of time for which the obstacle W and the working assembly 2 are away from each other is increased ((1) to (3) in FIG. 12(b)).

In contrast, in the present embodiment, when the side surface of the working assembly 2 contacts the obstacle W, the working assembly 2 is moved at the second, lower, retraction speed A2. Therefore, the amount of time for which the working assembly 2 and the obstacle W are away from each other is decreased, whereby the robot can do cleaning near the wall along the obstacle W.

Although not shown, when the front right portion of the front right bumper 21R contacts the protruding portion W1 of the obstacle W, the working assembly 2 may be moved slowly at the second retraction speed A2. In such a case, however, the avoidance from the protruding portion W1 of the obstacle W may be late, whereby the working assembly 2 may get caught on the protruding portion W1 even if the protruding portion W1 is relatively small, thus slanting the moving direction of the traveling assembly 1.

In contrast, in the present embodiment, when the obstacle W contacts the front surface of the working assembly 2, the working assembly 2 is moved quickly at the first retraction speed A1. Therefore, it is less likely that the working assembly 2 gets caught on the obstacle W.

Another case will now be described, where there is a relatively large protruding portion W2 at a point along the obstacle W, as shown in FIGS. 13(a) and 13(b).

As shown in FIG. 13(a), where the protruding portion W2 of the obstacle W is large, even if an avoidance operation of moving the working assembly 2 to the left at the first, higher, retraction speed A1 is performed, the avoidance operation may not be completed in time, whereby the working assembly 2 gets caught on the protruding portion W2, thus slanting the moving direction of the traveling assembly 1.

In view of this, an avoidance operation as follows is performed in the present embodiment.

When the obstacle W contacts the front right bumper 21R as shown in (4) of FIG. 13(b), the first right detection switch SR1 transmits a detection signal to the CPU 46 (FIG. 9(a)). The detection signal continues to be transmitted until there is no longer a contact with the obstacle W.

When the CPU 46 of FIG. 4 receives the detection signal from the first right detection switch SR1, the timer 49 is started to keep the detection time. The CPU 46 compares the detection time with a threshold value (time H) read out from the ROM 48, and stops the travel of the traveling assembly 1 shown in FIG. 13(b) if the detection time is longer than the threshold value (time H). After the stop, the CPU 46 moves the traveling assembly 1 backward over a predetermined distance. Moreover, the CPU 46 moves the working assembly 2 at the first retraction speed A1 by a predetermined distance in the retraction direction. Then, the traveling assembly 1 resumes moving forward.

As described above, when it is detected that the detection time of the first detection switch SR1 (SL1) exceeds a predetermined threshold value (time H), the travel of the traveling assembly 1 is once stopped and, after the stop, the traveling assembly 1 is moved backward over a predetermined distance. Thus, it is possible to prevent the working assembly 2 from getting caught on the obstacle W and thus prevents the moving direction of the traveling assembly 1 from slanting. It is also possible to prevent the obstacle W or the working assembly 2 from being scratched.

It is preferred that the threshold value (time H) is decreased (the time is shortened) as the traveling speed of the traveling assembly 1 increases. This is because as the traveling speed is higher, the amount of time before the working assembly 2 gets caught on the protrusion of the wall and the moving direction is slanted is shorter.

A method for such avoidance is, for example, to store a plurality of threshold values in the ROM 48, wherein a smaller threshold value is read out when the traveling speed of the traveling assembly 1 is higher while a larger threshold value is read out when the traveling speed is lower. Alternatively, the threshold value may be calculated based on the traveling speed by a predetermined calculation.

In the embodiment above, an optical sensor is used as an example of the contact sensor. However, the sensor may be of any type as long as it is capable of detecting a contact with an obstacle, and may be a contact-type switch, for example.

The left and right rear bumpers may be formed as an integral member. Only the left and right front bumpers may be used.

Second Embodiment:

General Configuration:

A working robot 100 of this embodiment includes the traveling assembly 1 and the working assembly 2 as shown in FIGS. 15(a) and 15(b). As shown in FIGS. 14(a) and 14(b), the traveling assembly 1 includes the driven wheels 6a and 6b for driving the traveling assembly 1, and non-driven wheels 9a and 9b for maintaining the balance of the traveling assembly 1. The driven wheels 6a and 6b are driven by drive motors 5a and 5b, respectively. The drive motors 5a and 5b can be spun in opposite directions (reversible), and the spinning thereof is controlled by a microcomputer (control means) 8.

When traveling straight, the two drive motors 5a and 5b are spun in the same direction so that the traveling assembly 1 can move forward or backward.

Figure 14:
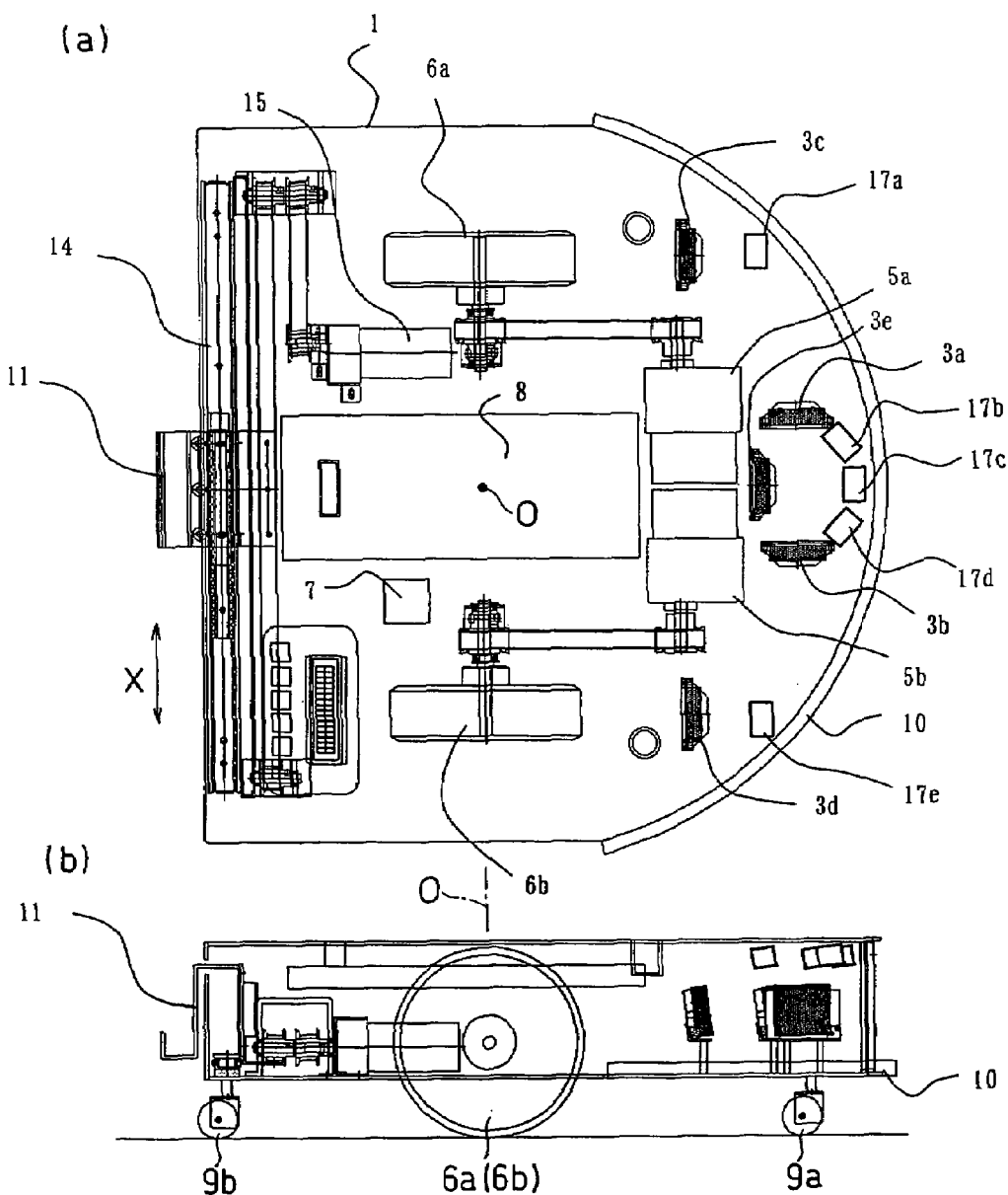
FIG. 14(a) is a plan view showing a configuration of a traveling assembly of a working robot according to the second embodiment.
FIG. 14(b) is a side view showing the same.

For a turn (rotating) operation, the two drive motors 5a and 5b are spun in opposite directions, whereby the traveling assembly 1 can turn (rotate) in place about a vertical line (center of rotation) O to the floor surface of FIG. 14.

The traveling assembly 1 can travel along a curve by controlling the ratio between the speeds of the two drive motors 5a and 5b.

The attachment plate 11 for the attachment of the working assembly 2 is provided in a rear portion of the traveling assembly 1. The attachment plate 11 is driven by the slide drive motor 15 and can be slid along the rail 14 in the width direction X of the traveling assembly 1.

The working assembly 2 of FIG. 15(a) is attached to the back of the traveling assembly 1 via the attachment plate 11. The working assembly 2 does work on the floor surface while being close to, or in contact with, the floor surface. For example, the working assembly 2 sucks up dust from the floor or waxes the floor surface. The working assembly 2, being attached to the attachment plate 11, can be slid in the width direction X with respect to the traveling assembly 1.

As shown in FIG. 14, a plurality of ultrasonic sensors 3a to 3e and a plurality of optical sensors 17a to 17e are provided in a front portion of the traveling assembly 1. The two ultrasonic sensors 3a and 3b, among these sensors, together constitute side distance measurement means for measuring the distance to an obstacle on the left or right of the traveling assembly 1. The other ultrasonic sensors 3c, 3d and 3e and the optical sensors 17a, 17b, 17c, 17d and 17e together constitute front distance measurement means for measuring the distance to an obstacle in front of the traveling assembly 1.

A bumper sensor 10 for detecting a contact with an obstacle is provided around the periphery of the front portion of the traveling assembly 1.

The ultrasonic sensors 3c, 3d and 3e and the optical sensors 17a, 17b, 17c, 17d and 17e are spaced apart from one another in the width direction X of the traveling assembly 1. The two optical sensors 17b and 17d, among the optical sensors 17a to 17d, are inclined by a predetermined angle with respect to the moving direction of the traveling assembly 1.

Control Configuration:

A control configuration will now be described.

As shown in FIG. 15(b), the drive motors 5a and 5b, the slide drive motor 15, the front distance measurement means 3c to 3e and 17a to 17e, the side distance measurement means 3a and 3b, a gyrosensor (rotation angle measurement means) 7, the bumper sensor 10, etc., are connected to the microcomputer 8A via interfaces (not shown).

The gyrosensor 7 measures the rotation angle of the traveling assembly 1 about the vertical line O, and is provided near the center of rotation O as shown in FIGS. 14(a) and 14(b).

The microcomputer 8A includes a CPU (control means, determination means) 80 and a memory (storage means) 81. The memory 81 stores various measured values obtained by the front distance measurement means 3c to 3e and 17a to 17e, the side distance measurement means 3a and 3b and the gyrosensor 7.

Operation:

The operation of the present working robot will now be described in detail.

First, referring to FIG. 16, a basic operation of doing work on a space surrounded by walls, which are right-angled with each other, will be described.

Figure 16:
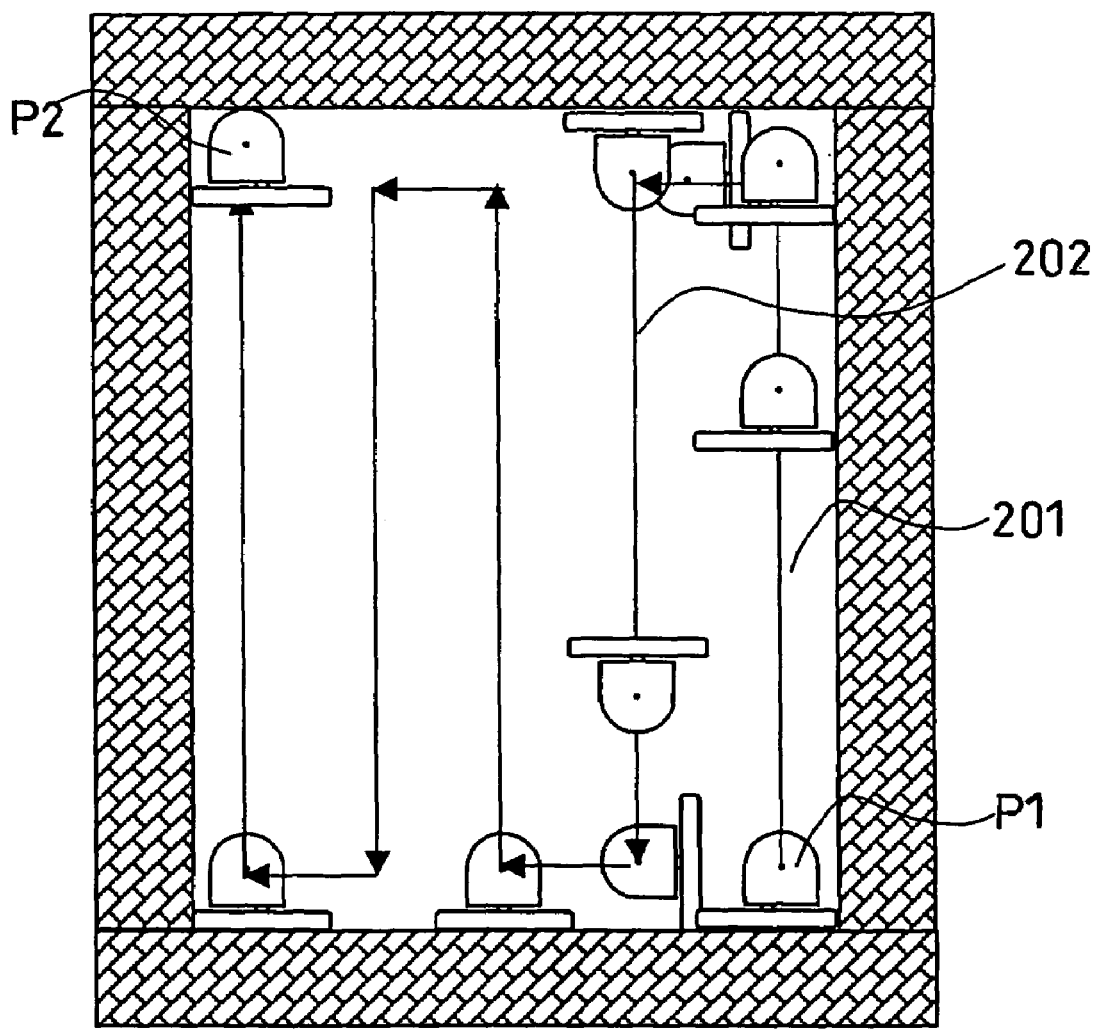
FIG. 16 is a plan view showing an operation where the robot does work on an area surrounded by walls being at right angles to each other.

As shown in FIG. 16, the working robot 100 travels successively along a plurality of traveling lanes 201 and 202 parallel to the wall surface of side walls (side obstacles). When the working robot 100 detects a wall in front (front obstacle) while traveling along one of the lanes, the traveling assembly 1 moves to the next traveling lane by turning in place by 90 degrees, moving forward along the front wall over a predetermined distance and then turning in place by 90 degrees. Thus, the working robot 100 does work on the target area by traveling from a start position P1 to an end position P2 while repeating the sequence of turning and traveling.

An operation where a diagonal wall is present in the work area will now be described.

Figure 17:
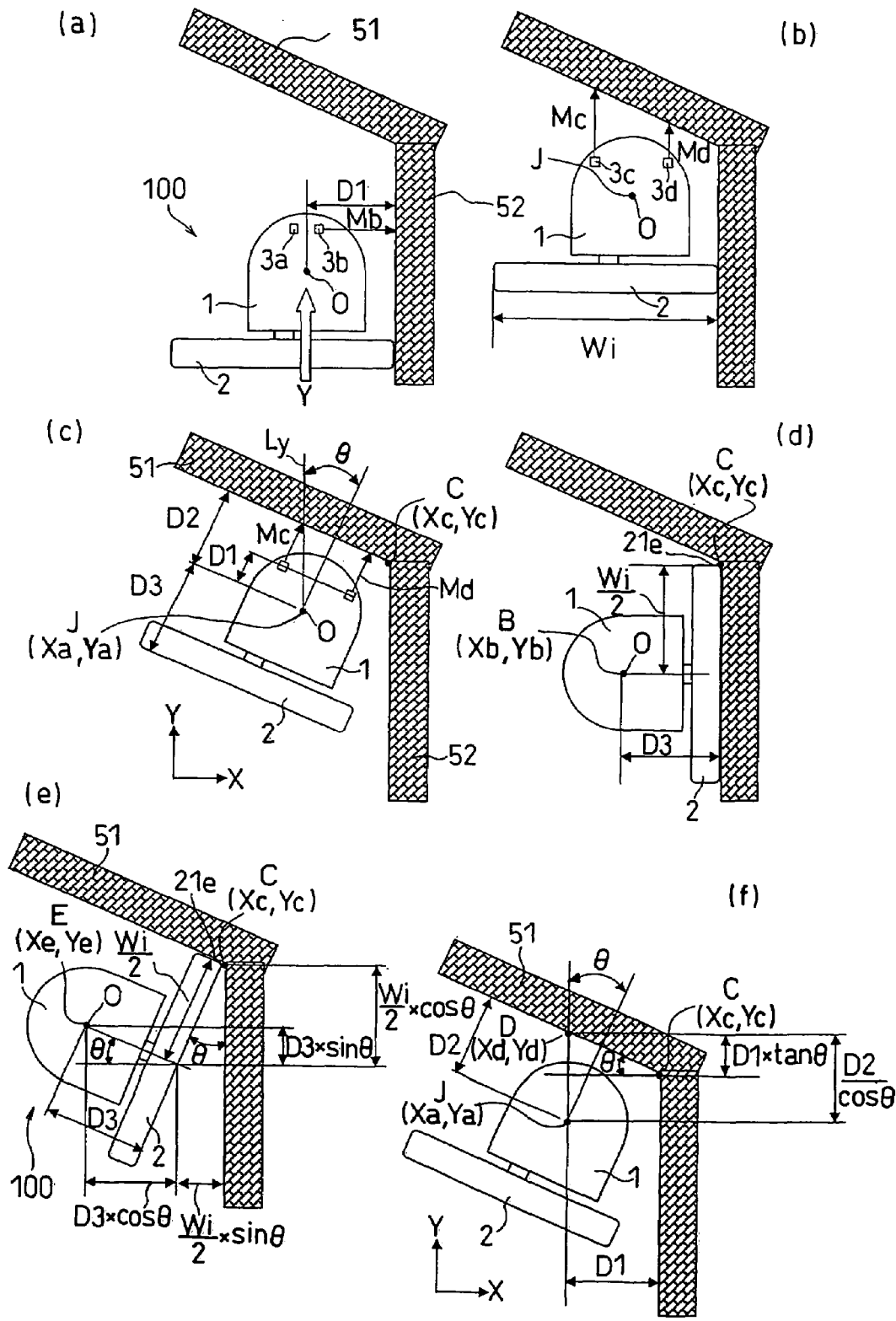
FIGS. 17(a) to 17(f) are plan views each showing an operation where the robot does work on a corner area with an obtuse angle.

FIG. 17 shows an example where the working robot 100 encounters a front diagonal wall 51 when the working robot 100 is doing work while moving forward along a side wall 52. This example is an example where the angle between the front diagonal wall 51 and the side wall 52 is an obtuse angle.

FIG. 17(a) shows the working robot 100 moving forward along the side wall 52. In this figure, D1 is the distance from the center of rotation O of the traveling assembly 1 to the side wall 52, and is calculated by adding the interval between the sensor 3b and the center of rotation O in the width direction X to a distance Mb measured by the sensor 3b. The measurement by the side distance measurement means 3a and 3b is repeated with a predetermined period, and the last 120 data points are chronologically stored in the memory 81. The traveled distance data of the traveling assembly 1 is detected by an encoder (not shown) connected to the drive motors 5a and 5b, and is stored in the memory 81.

FIG. 17(b) shows a state where the working robot 100 has stopped traveling, after detecting that the front wall 51 has come within a predetermined distance while moving forward along the side wall 52. In FIG. 17(b), Wi is the width of the working assembly 2, Mc is the distance measured by the left-side ultrasonic sensor 3c, and Md is the distance measured by the right-side ultrasonic sensor 3d. The traveling assembly 1 stops traveling when the value of the distance Md measured by the right-side sensor 3c becomes less than or equal to a predetermined threshold value (stop limit distance SHd). The position of the center of rotation O at this point in time is denoted as a point J.

In this standing state, the right side of the front wall 51 is closer to the traveling assembly 1, whereby the relationship between the measured distances Mc and Md is Mc>Md. Therefore, the CPU 80 determines that the right side of the front wall 51 is closer to the robot and the left side thereof is farther away from the robot. The CPU 80 compares the measured distances Mc and Md with each other, and determines whether or not the absolute value of the difference between Mc and Md is larger than another predetermined threshold value (inclination determination reference value SHa). If the absolute value of the difference between the measured distances Mc and Md is larger than the inclination determination reference value SHa (outside a predetermined value range), the CPU 80 turns the traveling assembly 1 in place clockwise so that the center of rotation O will not move from the position of the point J in order to measure the inclination angle of the front wall.

As shown in FIG. 17(c), when the traveling assembly 1 turns in place clockwise and the absolute value of the difference between the measured distances Mc and Md becomes less than or equal to the inclination determination reference value SHa (within a predetermined value range), the CPU 80 determines that the traveling assembly 1 and the front diagonal wall 51 are now facing straight to each other, and stops the turn of the traveling assembly 1. The rotation angle θ of the traveling assembly 1 at this point in time is measured by the gyrosensor 7, and stored in the memory 81. The distance D2 to the front wall 51 at this point in time is also stored in the memory 81.

FIG. 17(d) shows a state where the traveling assembly 1 has turned in place by 90 degrees with respect to the moving direction Y of FIG. 17(a) from the state of FIG. 17(c), whereby a right end portion 21e of the working assembly 2 is in contact with an intersection point C between the front wall 51 and the side wall 52, and the rear end of the working assembly 2 is in contact with the side wall 52. The position of the center of rotation O at this point in time is denoted as a point B.

From this state, the working robot 100 moves forward over a predetermined distance, thereby allowing the working robot 100 to do work on a corner area of the floor surface that was left undone in the state of FIG. 17(b).

FIG. 17(e) shows a state where the working robot 100 has taken an orientation along the front wall 51, wherein the right end portion 21e of the working assembly 2 is in contact with the point C. From this state, the working robot 100 moves forward over a predetermined distance, thereby allowing the working robot 100 to do work while traveling along the front wall 51.

The position of the point C is calculated by, for example, a numerical expression shown below.

In FIG. 17(f), assume that the coordinates of the point J are (Xa,Ya), those of the point C are (Xc,Yc), and those of a point D are (Xd,Yd). The point D is a point at which the center line Ly along the Y-axis direction of the traveling assembly 1 crosses the front wall 51.

The X coordinate of the point C, Xc=Xa+D1.
The Y coordinate of the point D, Yd=Ya+D2/cos θ.
The Y coordinate of the point C, Yc=Yd·D1×tan θ
=Ya+D2/cos θ·D1×tan θ.

From the expressions above, the coordinates (Xc,Yc) of the point C can be represented as follows by using the coordinates Xa and Ya of the point J, the distances D1 and D2 and the rotation angle θ.

$$Xc=Xa+D1$$

$$Yc=Ya+D2/\cos\theta\cdot D1\times\tan\theta$$

Thus, the coordinates (Xb,Yb) of the point B of FIG. 17(d) can be represented as follows by using a distance D3 from the center of rotation O to the rear end of the working assembly 2, and the width Wi of the working assembly.

$$\begin{aligned} Xb &= Xc - D3 \\ &= Xa + D1 - D3 \end{aligned} \quad (1)$$

$$\begin{aligned} Yb &= Yc - Wi/2 \\ &= Ya + D2/\cos\theta - D1 \times \tan\theta - Wi/2 \end{aligned} \quad (2)$$

Similarly, the coordinates (Xe,Ye) of the point E shown in FIG. 17(e) can be represented as follows.

$$\begin{aligned} Xe &= Xc - (Wi/2) \times \sin\theta - D3 \times \cos\theta \\ &= Xa + D1 - (Wi/2) \times \sin\theta - D3 \times \cos\theta \end{aligned} \quad (3)$$

$$\begin{aligned} Ye &= Yc - (Wi/2) \times \cos\theta + D3 \times \sin\theta \\ &= Ya + D2/\cos\theta - D1 \times \tan\theta - (Wi/2) \times \cos\theta + D3 \times \sin\theta \end{aligned} \quad (4)$$

As described above, it is possible to calculate the traveled distance in the X-axis direction and the Y-axis direction for moving from the point J to the point B and the point E. Thus, it is possible to autonomously move the working robot 100 so that the right end portion 21e of the working assembly 2 is in contact with the point C.

Referring to FIGS. 18(a) to 18(s), the operation flow will be described for an operation to be performed where the diagonal wall 51 appears in front of the working robot 100 when the working robot 100 is moving forward while doing work along the side wall 52. The illustrated example is an example where the angle between the front diagonal wall 51 and the side wall 52 is an obtuse angle.

Figure 18:
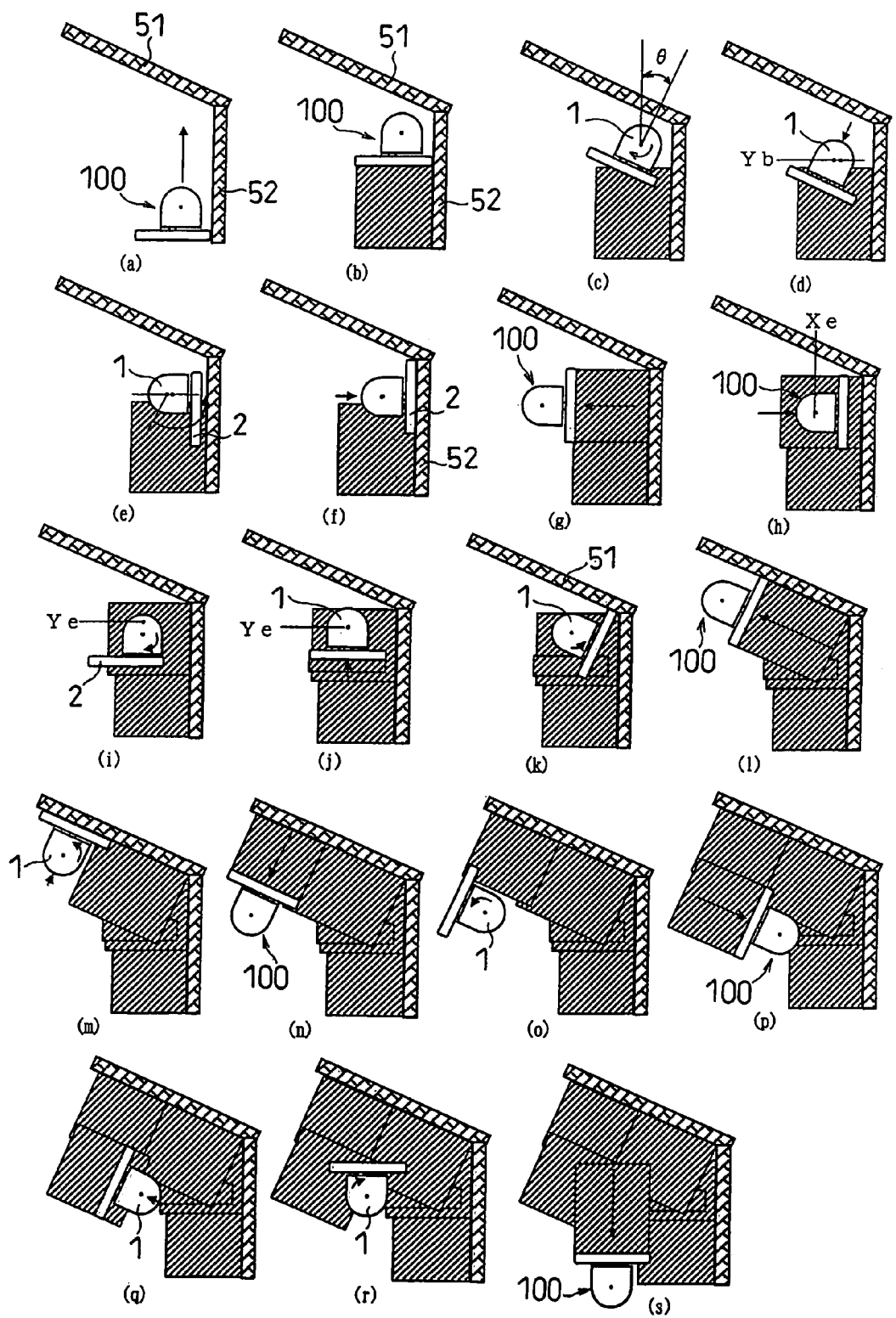
FIGS. 18(a) to 18(s) are plan views showing a series of steps of the operation.

The hatched area in FIG. 18 is an area where work has been done.

As shown in FIG. 18(a), the working robot 100 moves forward while doing work along the side wall 52. The last 120 measured data points from the side distance measurement means 3a and 3b, which are provided for measuring the distance to an obstacle in the left-right direction X of the drawing sheet, are stored in the memory 81 together with the traveled distance data at the time of measurement.

As shown in FIG. 18(b), as the front distance measurement means 3c to 3e and 17a to 17e detect the appearance of the front wall (front obstacle) 51, the traveling assembly 1 stops traveling. Then, the measured distances Mc and Md obtained by the sensors 3c and 3d are compared with each other to find that the absolute value of the difference between Mc and Md is larger than the inclination determination reference value SHa and that Mc>Md, thereby determining that the front obstacle is a diagonal wall whose right side is closer to the robot and whose left side is farther away from the robot. Moreover, based on the history of the last 120 measured distances from the side distance measurement means 3a and 3b and the traveled distance data at the time of the distance measurement, it is determined that the wall 52 is present on the right side of the traveling assembly 1.

Then, as shown in FIG. 18(c), the traveling assembly 1 repeatedly measures the distance to the front wall 51 by using the left and right sensors 3c and 3d while turning in place clockwise, and the traveling assembly 1 stops the turn operation when the absolute value of the difference between the values of the distances Mc and Md measured by the left and right sensors 3c and 3d becomes less than or equal to the inclination determination reference value SHa.

In FIG. 18(d), the CPU 80 calculates the coordinates of the point B (FIG. 17(d)) based on Expressions (1) and (2) above, and moves back the traveling assembly 1 until the Y coordinate of the center of rotation O becomes equal to the Y coordinate Yb of the point B. Then, as shown in FIG. 18(e), with the working assembly 2 having been slid to the leftmost position with respect to the traveling assembly 1, the traveling assembly 1 turns in place counterclockwise by an angle of (θ+90°). Then, as shown in FIG. 18(f), the robot moves back until the X coordinate of the center of rotation O becomes equal to the X coordinate Xb of the point B. The traveling assembly 1 stops moving back when a contact sensor (not shown) provided in a rear end portion of the working assembly 2 contacts the side wall 52 during the backward movement. Thus, the working assembly 2 can be moved until the right end portion 21e of the working assembly 2 is in contact with the point C.

Then, as shown in FIG. 18(g), the working robot 100 does work while moving forward over a distance corresponding to the width Wi of the working assembly 2. Thus, work will be done for a portion of the corner area. In FIG. 18(h), the CPU 80 calculates the coordinates of the point E (FIG. 17(e)) based on Expressions (3) and (4) above, and moves back the traveling assembly 1 until the X coordinate of the center of rotation O becomes equal to the X coordinate Xe of the point E. Then, as shown in FIG. 18(i), with the working assembly 2 having been slid to the leftmost position with respect to the traveling assembly 1, the traveling assembly 1 turns in place clockwise by 90 degrees. Then, as shown in FIG. 18(j), the working robot 100 does work while moving forward until the Y coordinate of the center of rotation O becomes equal to the Y coordinate Ye of the point E. Then, as shown in FIG. 18(k), the traveling assembly 1 turns in place counterclockwise by an angle of θ to thereby take an orientation along the front diagonal wall 51.

As shown in FIG. 18(l), the working robot 100 moves forward over a predetermined distance while doing work along the diagonal wall 51. Thus, work will be done for the rest of the corner area and a portion of the space along the front wall 51. Then, as shown in FIG. 18(m), the traveling assembly 1 turns in place counterclockwise by 90 degrees, and then moves back until the rear end of the working assembly 2 contacts the front wall 51. Then, as shown in FIG. 18(n), the working robot 100 moves forward over a predetermined distance while doing work.

Then, as shown in FIG. 18(o), the traveling assembly 1 turns in place counterclockwise by 90 degrees. Then, as shown in FIG. 18(p), the working robot 100 moves forward over a predetermined distance while doing work. Then, as shown in FIG. 18(q), the robot moves back until the X coordinate of the center of rotation O becomes equal to the center position of an adjacent lane next to the lane in which the robot has been traveling in FIG. 18(a). As shown in FIG. 18(r), as the traveling assembly 1 turns in place clockwise by an angle of (90°-θ), the traveling assembly 1 will be facing in the direction 180-degree opposite to the moving direction in FIG. 18(a). Then, as shown in FIG. 18(s), the working robot 100 moves forward while doing work, thus doing work on the next lane.

As described above, the working robot 100 is capable of doing work completely even in corner areas surrounded by walls even if there is a diagonal wall.

Now, referring to FIGS. 19(a) to 19(l), the operation flow will be described for an operation to be performed where the diagonal wall 51 appears in front of the working robot 100 when the working robot 100 is moving forward while doing work on a lane away from the side wall and where there is a smaller distance between the traveling assembly 1 and the work start position P1 of the front diagonal wall while there is a larger distance between the traveling assembly 1 and the work end position P2.

Figure 19:
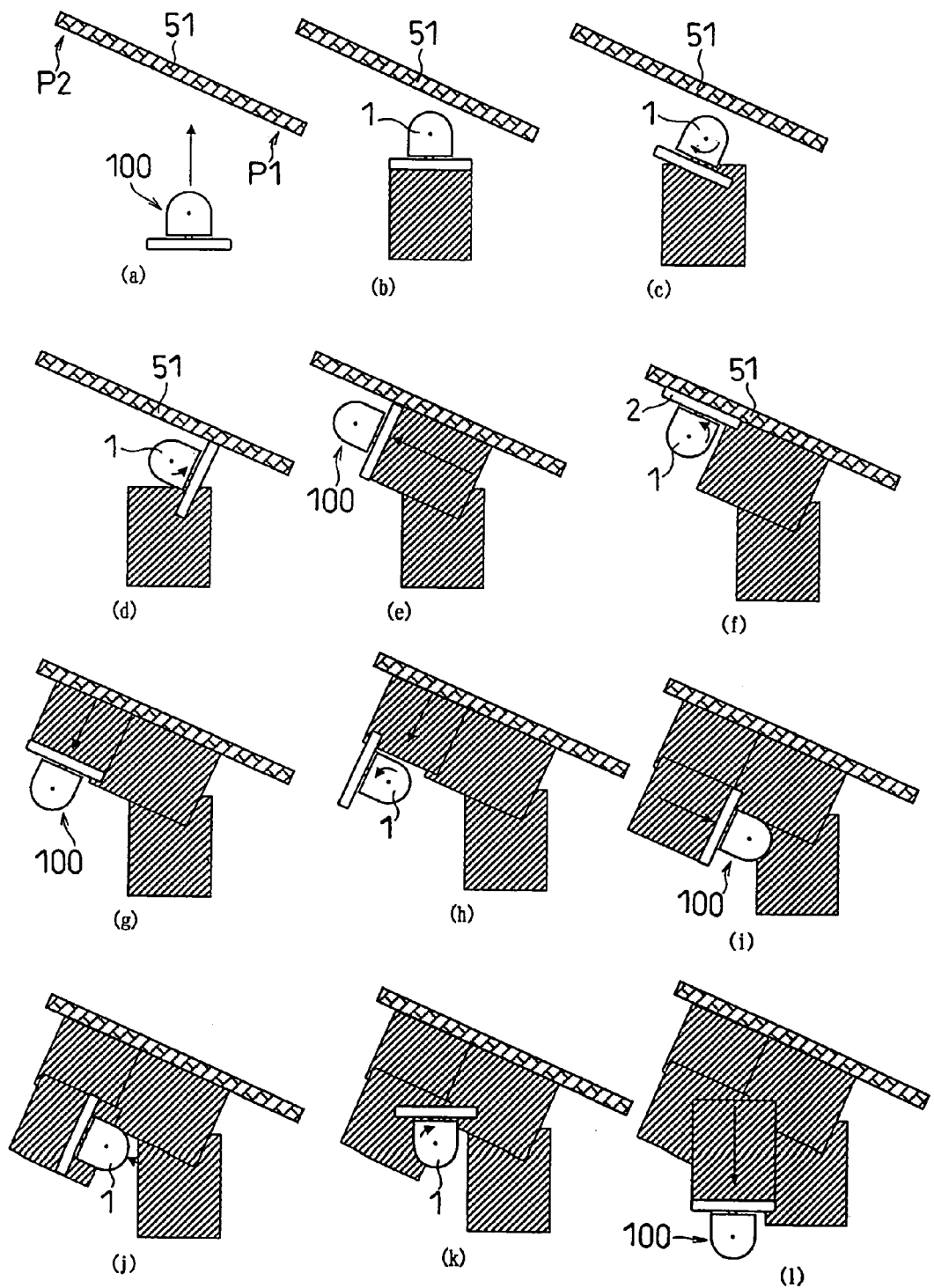
FIGS. 19(a) to 19(l) are plan views each showing an operation where the robot works along a diagonal wall on a lane away from a side wall.

As shown in FIGS. 19(a) to 19(b), the working robot 100 moves forward while doing work on a lane away from the side wall 52, and stops traveling when it detects the front wall 51. Then, the CPU 80 determines whether or not there is a side wall beside the traveling assembly 1 and also determines whether or not the inclination of the front wall 51 is greater than or equal to a predetermined angle.

Then, as shown in FIG. 19(c), the traveling assembly 1 turns in place clockwise, and stops turning when the traveling assembly 1 is generally facing straight to the front wall 51. Then, as shown in FIG. 19(d), the traveling assembly 1 turns in place counterclockwise by 90 degrees to thereby take an orientation along the front diagonal wall 51.

As shown in FIGS. 19(e) to 19(l), the operation flow thereafter is similar to that where the robot is working along the side wall 52 (see FIGS. 18(l) to 18(s)), and will not be further described below.

Now, referring to FIGS. 20(a) to 20(l), the operation flow will be described for an operation to be performed where the diagonal wall 51 appears in front of the working robot 100 when the working robot 100 is moving forward while doing work on a lane away from the side wall and where there is a larger distance between the traveling assembly 1 and the work start position P1 of the front diagonal wall 51 while there is a smaller distance between the traveling assembly 1 and the work end position P2.

Figure 20:
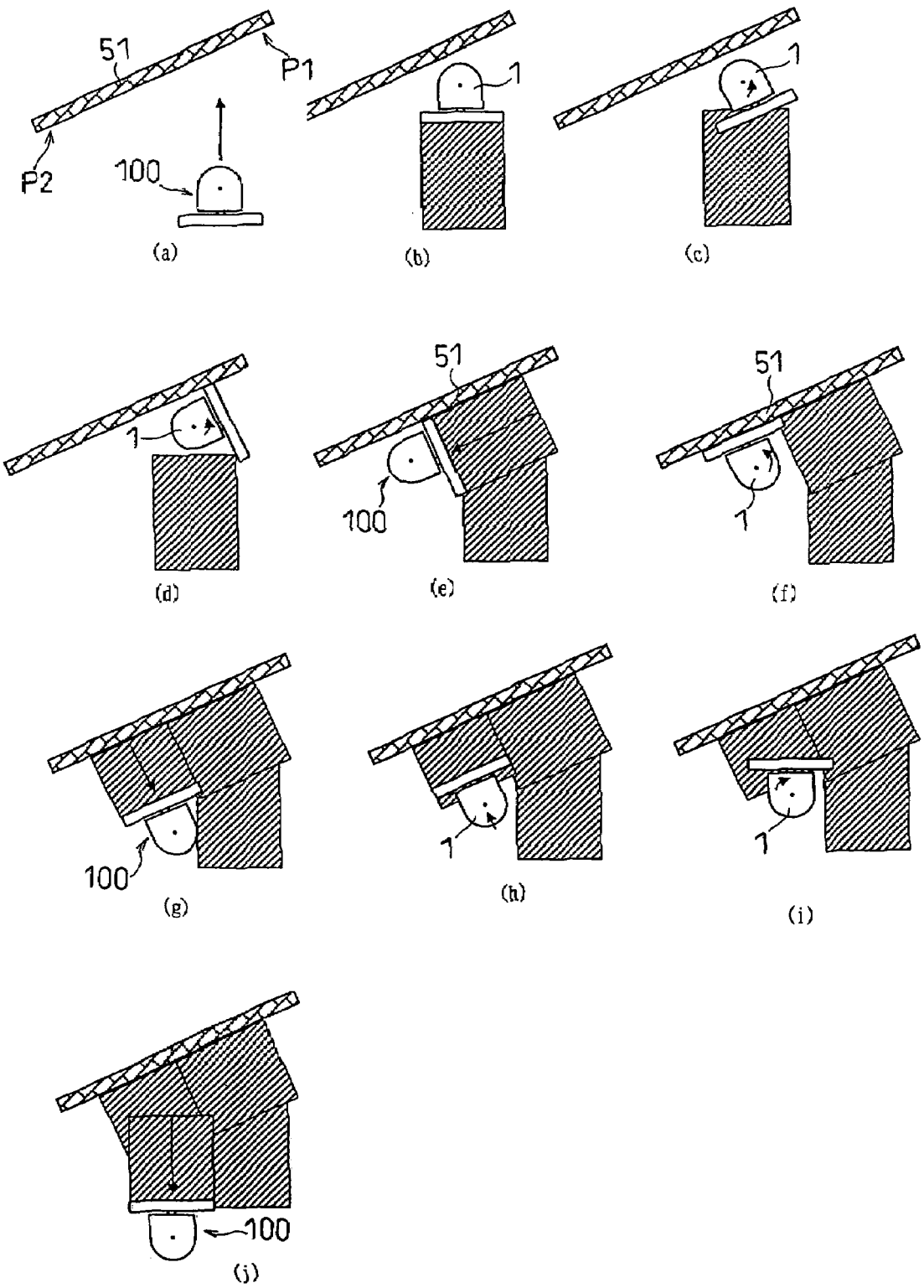
FIGS. 20(a) to 20(j) are plan views each showing an operation where the robot works along a diagonal wall on a lane away from a side wall.

As shown in FIGS. 20(a) to 20(b), the working robot 100 moves forward while doing work on a lane away from the side wall 52, and stops traveling when it detects the front wall 51. Then, the CPU 80 determines whether or not there is a side wall beside the traveling assembly 1 and also determines whether or not the inclination of the front wall 51 is greater than or equal to a predetermined angle. Thereafter, the working robot 100 operates slightly differently from the operation shown in FIGS. 19(a) to 19(e).

As shown in FIG. 20(c), the traveling assembly 1 repeatedly measures the distance to the front wall 51 by using the left and right sensors 3c and 3d while turning in place counterclockwise, and the traveling assembly 1 stops turning when the absolute value of the difference between the values of the distances Mc and Md measured by the left and right sensors 3c and 3d becomes less than or equal to the inclination determination reference value SHa. Then, as shown in FIG. 20(d), the traveling assembly 1 turns in place counterclockwise by 90 degrees to thereby take an orientation along the front wall 51. Then, as shown in FIG. 20(e), the working robot 100 moves forward over a predetermined distance while doing work along the diagonal wall 51. Thus, work will be done for a portion of the space along the front diagonal wall 51.

Then, as shown in FIG. 20(f), the traveling assembly 1 turns in place counterclockwise by 90 degrees, and moves back until the rear end of the working assembly 2 contacts the front wall 51. Then, as shown in FIG. 20(g), the working robot 100 moves forward over a predetermined distance while doing work.

Then, as shown in FIG. 20(h), the robot moves back until the X coordinate of the center of rotation O becomes equal to the center position of an adjacent lane next to the lane in which the robot has been traveling in FIG. 20(a). As shown in FIG. 20(i), as the traveling assembly 1 turns in place clockwise by an angle of θ, the traveling assembly 1 will be facing in the direction 180-degree opposite to the moving direction in FIG. 20(a). Then, as shown in FIG. 20(j), the working robot 100 moves forward while doing work, thus doing work on the next lane.

Now, referring to FIGS. 21(a) to 21(n), the operation flow will be described for an operation to be performed where the diagonal wall 51 appears in front of the working robot 100 when the working robot 100 is moving forward while doing work along a side wall. Note however that this is an example where the angle between the front diagonal wall 51 and the side wall 52 is an acute angle.

Figure 21:
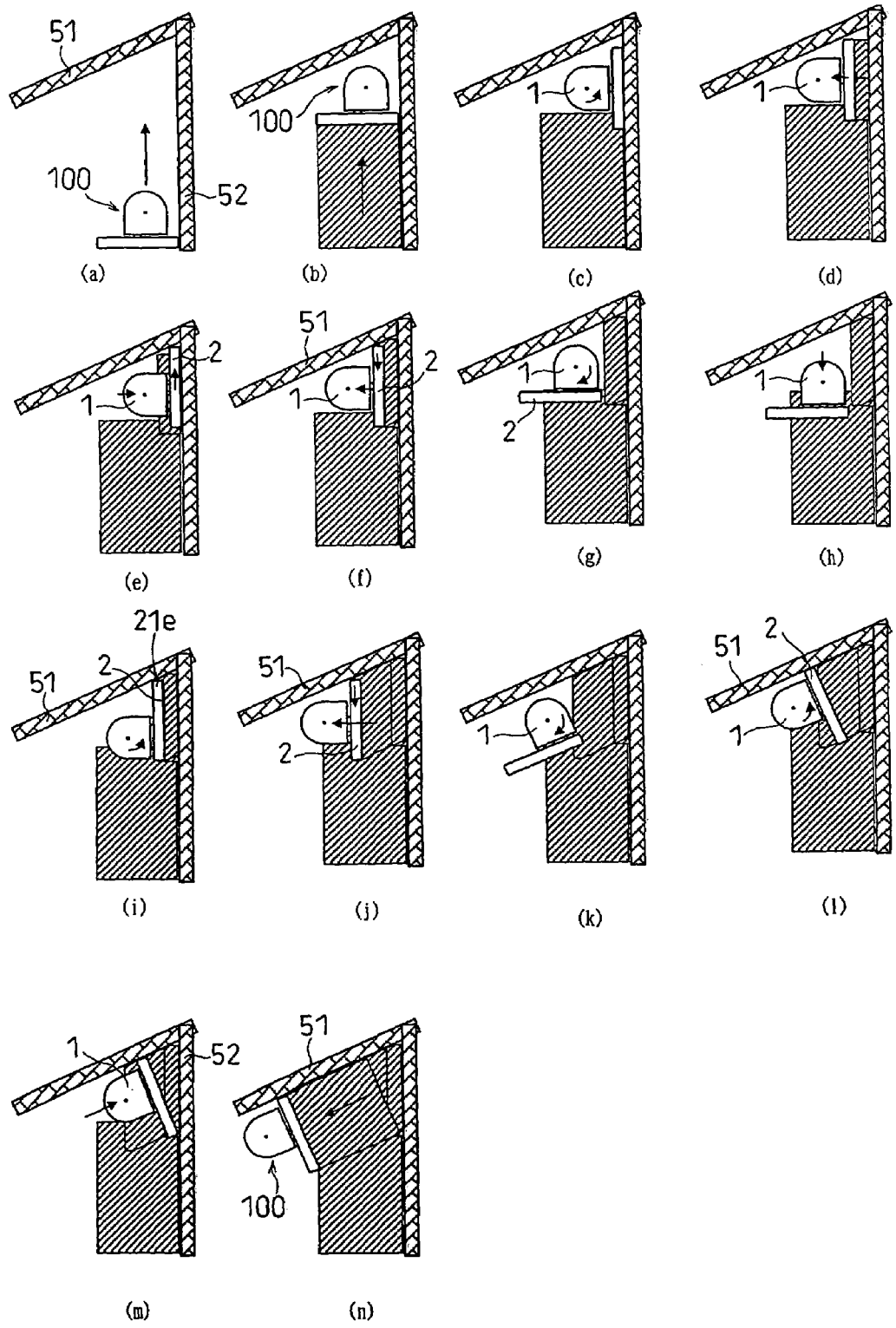
FIGS. 21(a) to 21(n) are plan views each showing an operation where the robot does work on a corner area with an acute angle.

As shown in FIG. 21(a), the working robot 100 moves forward while doing work along the side wall 52. The last 120 measured data points from the side distance measurement means 3a and 3b, which are provided for measuring the distance to an obstacle in the left-right direction X of the drawing sheet, are stored in the memory 81 together with the traveled distance data at the time of measurement.

As shown in FIG. 21(b), as the front distance measurement means 3c to 3e and 17a to 17e detect the appearance of the obstacle 51 in front of the robot, the traveling assembly 1 stops traveling. Then, the measured distances Mc and Md of the sensors 3c and 3d are compared with each other to find that the absolute value of the difference between Mc and Md is larger than the inclination determination reference value SHa and that Mc<Md, thereby determining that the front obstacle 51 is a diagonal wall whose right side is farther away from the robot and whose left side is closer to the robot. Moreover, based on the history of the last 120 measured distances from the side distance measurement means 3a and 3b and the traveled distance data at the time of the distance measurement, it is determined that the wall 52 is present on the right side of the traveling assembly 1.

Then, as shown in FIG. 21(c), the traveling assembly 1 turns in place counterclockwise by 90 degrees. Then, the robot moves back until the rear end of the working assembly 2 contacts the side wall 52. As shown in FIG. 21(d), after the backward movement, the working robot 100 moves forward while doing work and again detects the front wall 51, thereby stopping traveling. As shown in FIG. 21(e), the traveling assembly 1 moves back again until the rear end of the working assembly 2 contacts the side wall 52. Then, the working assembly 2 moves to the right with respect to the traveling assembly 1 until the right end portion 21e of the working assembly 2 contacts the front wall 51. Then, as shown in FIG. 21(f), the working robot 100 moves forward while doing work. During the movement, the working assembly 2 is controlled to gradually move to the left along the front wall 51. The working robot 100 keeps traveling until it again detects the front wall 51.

As shown in FIG. 21(g), the working robot 100 turns in place clockwise by 90 degrees after the working assembly 2 moves to the leftmost position with respect to the traveling assembly 1 from the state where the robot detects the front wall 51 and stops traveling. As shown in FIG. 21(h), the robot moves back from this state to a calculated position such that the right end portion 21 of the working assembly 2 would be in contact with the front wall 51 if the traveling assembly 1 turns in place counterclockwise by 90 degrees and the working assembly 2 moves to the rightmost position with respect to the traveling assembly 1. Then, as shown in FIG. 21(i), the traveling assembly 1 turns in place counterclockwise by 90 degrees, and the working assembly 2 is moved to the right with respect to the traveling assembly 1 until the right end portion 21e of the working assembly 2 contacts the front wall 51.

Then, as shown in FIG. 21(j), the working robot 100 moves forward while doing work, and stops when it detects the front wall 51. During the movement, the working assembly 2 is controlled to gradually move to the left along the front wall 51.

Then, as shown in FIG. 21(k), the traveling assembly 1 repeatedly measures the distance to the front wall 51 by using the left and right front sensors 3c and 3d while turning in place clockwise, and the traveling assembly 1 stops turning when the absolute value of the difference between the values of the distances Mc and Md measured by the sensors 3c and 3d becomes less than or equal to the inclination determination reference value SHa. Then, as shown in FIG. 21(l), the traveling assembly 1 turns in place counterclockwise by 90 degrees, and the working assembly 2 contacts the front diagonal wall 51. Thereafter, as shown in FIG. 21(m), the robot moves back until the rear end of the working assembly 2 contacts the side wall 52. Then, as shown in FIG. 21(n), the working robot 100 moves forward over a predetermined distance while doing work along the diagonal wall 51. Thus, work will be done for a portion of the space along the front diagonal wall 51. Thereafter, the working robot 100 operates in a similar manner to that shown in FIGS. 20(f) to 20(j), and moves onto the next lane.

Figure 22:
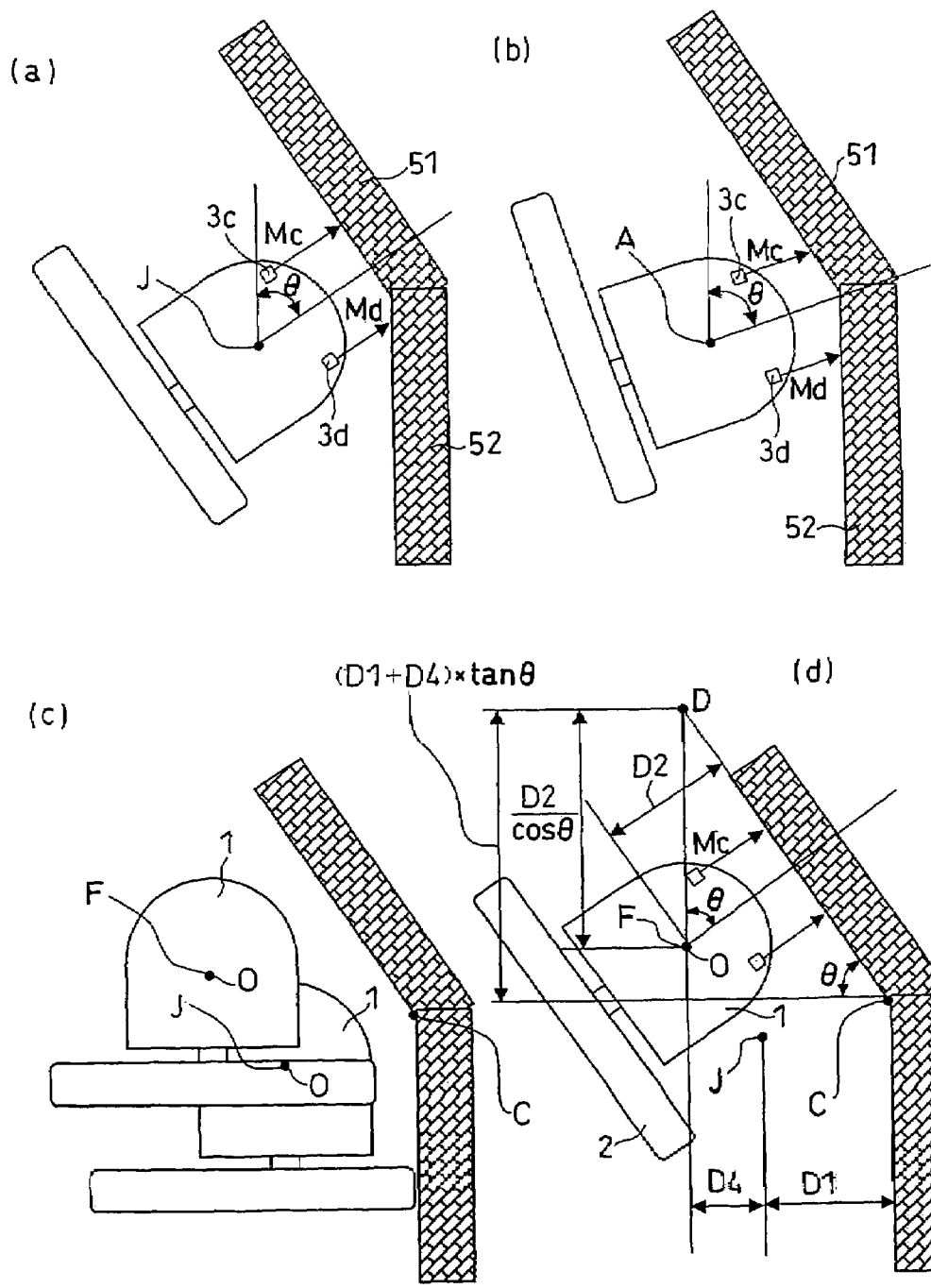
FIGS. 22(a) to 22(d) are plan views each showing an operation of the second embodiment.

As shown in FIG. 22(a), even though the robot is actually facing straight to the diagonal wall 51, the right ultrasonic sensor 3d may erroneously detect the side wall 52, whereby the measured distances Mc and Md from the left and right sensors 3c and 3d may not be close values, or the reflection of the ultrasonic wave emitted from the ultrasonic sensor 3d may not return, thus failing to measure the distance. In such a case, the traveling assembly 1 does not stop turning in the state of FIG. 22(a), but it stops turning when the measured distance Md of the right ultrasonic sensor 3d and the measured distance Mc of the left ultrasonic distance sensor 3c become substantially equal to each other as shown in FIG. 22(b), and the rotation angle θ at that point in time is erroneously recognized as the inclination angle of the diagonal wall 51. This recognition leads to errors in subsequent operations.

In view of this, such a problem is solved as follows. In the case where the traveling assembly 1 is traveling along the side wall 52, the center of rotation O for the turn operation is moved over a predetermined distance away from the side wall 52 before measuring the inclination angle of the diagonal wall 51. Specifically, as shown in FIG. 22(c), the center of rotation O is moved from the position of the point J to the position of the point F away from the side wall 52. Then, as shown in FIG. 22(d), it is possible to accurately measure the angle θ with the robot facing straight to the diagonal wall 51 without the right ultrasonic sensor 3d measuring the distance to the side wall 52.

A specific example of such an operation will be described with reference to FIGS. 23(a) to 23(k).

Figure 23:
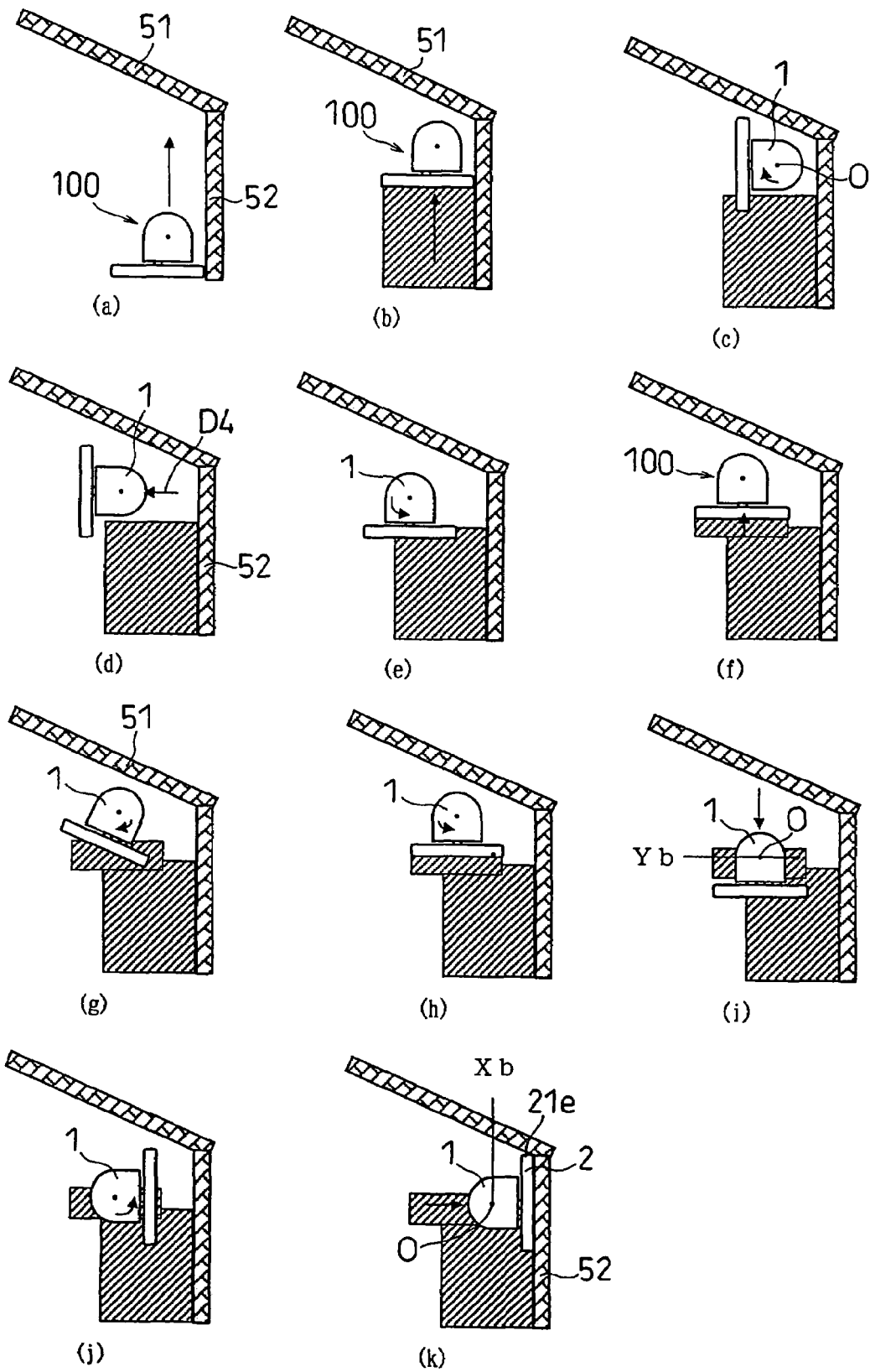
FIGS. 23(a) to 23(k) are plan views showing a series of steps of the operation.

The operation of FIGS. 23(a) to 23(b) is similar to that of FIGS. 18(a) to 18(b), and will not be further described below. As shown in FIG. 23(c), the traveling assembly 1 turns in place clockwise by 90 degrees. Then, as shown in FIG. 23(d), the traveling assembly 1 moves back over a predetermined distance away from the side wall 52, and the traveled distance D4 at this point in time is stored. As shown in FIG. 23(e), after the backward movement, the traveling assembly 1 turns in place counterclockwise by 90 degrees. Then, as shown in FIG. 23(f), the working robot 100 moves forward while doing work, and stops traveling when it detects an obstacle in front of the robot.

Then, as shown in FIG. 23(g), the traveling assembly 1 turns in place clockwise, and the inclination angle θ of the front diagonal wall is stored. As shown in FIG. 23(h), the traveling assembly 1 turns in place counterclockwise by the angle of θ, thereby returning to the same direction as the moving direction Y of FIG. 23(f). In FIG. 23(i) the CPU calculates the coordinates of the point B (FIG. 17(d)) based on Expressions (5) and (6) below, and the robot moves back until the Y coordinate of the center of rotation O becomes equal to the Y coordinate Yb of the point B. Then, as shown in FIG. 23(j), the traveling assembly 1 turns in place counterclockwise by 90 degrees, and moves back until the X coordinate of the center of rotation O becomes equal to the X coordinate Xb of the point B as shown in FIG. 23(k). During the backward movement, the rear end of the working assembly 2 contacts the side wall 52, upon which the backward movement is stopped. Thus, the right end portion 21e of the working assembly 2 can be moved to a position in contact with the point C. Thereafter, the working robot 100 operates in a similar manner to that shown in FIGS. 18(g) to 18(s), and moves onto the next lane.

The coordinates of the point B are calculated based on a numerical expression below, for example. In FIGS. 22(c) and 22(d), assume that the coordinates of the point C are (Xc,Yc), the coordinates of the point D are (Xd,Yd), and the coordinates of the point F are (Xf,Yf).

The X coordinate of the point C, Xc=Xa+D1=Xf+D4+D1.

The Y coordinate of the point D, Yd=Yf+D2/cos θ.

The Y coordinate of the point C, Yc=Yd−(D1+D4)×tan θ =Yf+D2/cos θ−(D1+D4)×tan θ.

As described above, the coordinates (Xc,Yc) of the point C can be represented as follows by using the coordinates (Xf, Yf) of the point F, D1, D2, D4 and θ.

$$Xc = Xf + D4 + D1$$

$$Yc = Yf + D2/\cos θ − (D1+D4) \times \tan θ$$

Thus, the coordinates (Xb,Yb) of the point B of FIG. 17(d) can be represented as follows by using the distance D3 from the center of rotation O to the rear end of the working assembly 2 and the width W of the working assembly 2.

$$Xb = Xc − D3 = Xf + D4 + D1 − D3 \qquad (5)$$

$$\begin{aligned} Yb &= Yc − Wi/2 \\ &= Yf + D2/\cos θ − (D1+D4) \times \tan θ − Wi/2 \end{aligned} \qquad (6)$$

It is preferred that the plurality of the ultrasonic sensors 3a to 3e perform their measurement operations successively in a predetermined order with regular intervals therebetween in order to avoid the interference between ultrasonic waves.

An ultrasonic sensor measures the distance to an obstacle by measuring the amount of time after an ultrasonic wave is emitted until the reflected wave off the obstacle returns. Therefore, if the obstacle has a large inclination, the ultrasonic wave may not return to the ultrasonic sensor, whereby the measurement fails. Thus, using only ultrasonic sensors, it is only possible to detect obstacles with small inclinations.

In view of this, the optical sensors 17a to 17e are provided in addition to the ultrasonic sensors 3a to 3e in the present invention (see FIG. 24(a)). Generally, an optical sensor can detect a portion of light scattered and reflected by the measured object if the surface of the measured object has a diffusing surface but not a mirror surface, whereby it is possible to measure the distance even with an obstacle with a large inclination.

Therefore, for example, even when the obstacle 51 has a large inclination with respect to moving direction Y of the working robot 100 as shown in FIG. 24(a), the measurement can be done with the optical sensors 17a to 17e, whereby it is possible to improve the obstacle detection precision.

Thus, for example, if the right ultrasonic sensor 3d does not detect the obstacle 51 while the right optical sensor 17e is detecting the obstacle 51, it can be determined that the diagonal wall 51 is present on the right side of the robot.

The magnitude of the inclination of a wall can be determined to a certain degree by comparing the measured value of an optical sensor for the measurement straight in the forward direction with that of another optical sensor inclined by a predetermined angle. Therefore, it is possible to perform a more sophisticated operation, e.g., an operation of regarding a wall as a side wall when the wall is significantly inclined (i.e., being able to differentiate FIG. 24(a) and FIG. 24(b) from each other).

If the inclination of the wall 51 or 52 is small as shown in FIG. 24(b), the ultrasonic sensors 3c to 3e detect the obstacle 51 or 52 while the optical sensors 17b and 17d detects the obstacle 51 or 52. In such a case, it is determined that the inclination of the obstacle 51 or 52 with respect to the moving direction of the traveling assembly is smaller than a predetermined inclination angle. If the inclination of the wall 51 or 52 is large as shown in FIG. 24(a), the ultrasonic sensors. 3c to 3e do not detect the obstacle 51 or 52 while the optical sensor 17d detects the obstacle 51 or 52. In such a case, it is determined that the inclination of the obstacle 51 or 52 with respect to the moving direction of the traveling assembly is larger than a predetermined inclination angle.

Moreover, by providing ultrasonic sensors and/or optical sensors on each of the left side and the right side of the robot, it is possible to also detect whether or not the robot is traveling toward a corner area. When it is determined that the robot is traveling toward a corner area, the orientation of the robot may be changed so that the robot is along either wall.

In the above embodiment, it is determined whether or not the traveling assembly is traveling along a side wall based on a history of a plurality of measured values obtained by side distance measurement means. Alternatively, the measured values for the determination may be obtained by providing a plurality of, or a large number of, measurement means.

The inclination of an obstacle in front of the robot is determined based on whether or not the difference between measured distances is larger than the inclination determination reference value SHa. Alternatively, the determination can be made based on the ratio between the measured distances Mc and Md (Mc/Md or Md/Mc) of FIGS. 17(b) and 17(c). With a robot making the determination based on the ratio, it is determined that the inclination of the obstacle 51 is small if the ratio is close to 1.0, i.e., if the ratio is within a predetermined range, as shown in FIG. 17(c), and it is determined that the inclination of the obstacle 51 is large if the ratio is not close to 1.0, i.e., if the ratio is outside the predetermined range, as shown in FIG. 17(b). Thus, the determination can be made based on whether or not the ratio between the measured distances is within a predetermined range.

The number and arrangement of each type of sensors, i.e., the front distance measurement means and/or the side distance measurement means, are not limited to those shown in the embodiments above, but may be appropriately determined. Moreover, the numerical expressions used for controlling the operation in corner areas are not limited to those shown above, but other control methods may be used.

While preferred embodiments of the present invention have been described above with reference to the drawings, obvious variations and modifications will readily occur to those skilled in the art upon reading the present specification.

For example, as to the structure of the wheels, swivel casters may be employed. The robot may be a robot for performing operations such as applying a liquid agent.

Thus, such variations and modifications shall fall within the scope of the present invention as defined by the appended claims.

INDUSTRIAL APPLICABILITY

The robot of the present invention can be applied to robots for doing various types of work while traveling by themselves.

The invention claimed is:

1. A self-propelled working robot comprising:
   a traveling assembly having a wheel rotating on a floor surface;
   a working assembly for doing work on the floor surface, wherein the working assembly is attached to the traveling assembly so that the working assembly is movable in a left-right direction with respect to the traveling assembly;
   a moving mechanism for moving the working assembly with respect to the traveling assembly so as to change a positional relationship between the traveling assembly and the working assembly;
   a first contact sensor provided in the working assembly for detecting a contact of the obstacle with a front surface of the working assembly;
   a second contact sensor provided in the working assembly for detecting a contact of the obstacle with a side surface of the working assembly; and
   means for controlling a travel of the traveling assembly, for controlling the moving mechanism to move the working assembly left and right at a first retraction speed based on a detection signal from the first contact sensor, and for controlling the moving mechanism to move the working assembly left and right at a second retraction speed, being lower than the first retraction speed, based on a detection signal from the second contact sensor.

2. A self-propelled working robot according to claim 1, wherein the control means further comprises means for stopping the travel when a time for which a contact is being detected by the first contact sensor is longer than a predetermined time (H).

3. A self-propelled working robot according to claim 2, wherein the predetermined time (H) is set to a small value when a traveling speed is high, and is set to a large value when the traveling speed is low.

* * * * *